United States Patent
Ito et al.

(10) Patent No.: US 10,723,832 B2
(45) Date of Patent: Jul. 28, 2020

(54) POLYMERIZABLE COMPOSITION FOR OPTICAL MATERIAL AND OPTICAL MATERIAL AND PLASTIC LENS OBTAINABLE FROM SAME COMPOSITION

(71) Applicant: MITSUI CHEMICALS, INC., Minato-ku, Tokyo (JP)

(72) Inventors: Shinsuke Ito, Omuta (JP); Kouji Suesugi, Arao (JP); Takeshi Nishimura, Yanagawa (JP); Kouju Okazaki, Ichihara (JP); Mamoru Tanaka, Fukuoka (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 19 days.

(21) Appl. No.: 15/547,911

(22) PCT Filed: Feb. 2, 2016

(86) PCT No.: PCT/JP2016/053046
§ 371 (c)(1),
(2) Date: Aug. 1, 2017

(87) PCT Pub. No.: WO2016/125786
PCT Pub. Date: Aug. 11, 2016

(65) Prior Publication Data
US 2018/0022860 A1 Jan. 25, 2018

(30) Foreign Application Priority Data

Feb. 3, 2015 (JP) .................................. 2015-019085
Feb. 27, 2015 (JP) .................................. 2015-037752
Nov. 18, 2015 (JP) .................................. 2015-226081

(51) Int. Cl.
| | |
|---|---|
| *C08G 18/61* | (2006.01) |
| *C08L 83/12* | (2006.01) |
| *G02B 1/04* | (2006.01) |
| *C08L 101/00* | (2006.01) |
| *C08L 27/12* | (2006.01) |
| *C08G 18/10* | (2006.01) |
| *C08G 18/24* | (2006.01) |
| *C08G 18/40* | (2006.01) |
| *C08G 18/48* | (2006.01) |
| *C08G 18/71* | (2006.01) |
| *C08G 18/75* | (2006.01) |
| *C08G 18/76* | (2006.01) |

(52) U.S. Cl.
CPC ............ *C08G 18/61* (2013.01); *C08G 18/10* (2013.01); *C08G 18/242* (2013.01); *C08G 18/4009* (2013.01); *C08G 18/4829* (2013.01); *C08G 18/71* (2013.01); *C08G 18/758* (2013.01); *C08G 18/7621* (2013.01); *C08L 27/12* (2013.01); *C08L 83/12* (2013.01); *C08L 101/00* (2013.01); *G02B 1/04* (2013.01); *G02B 1/041* (2013.01)

(58) Field of Classification Search
CPC ................................ C08G 77/46; C08G 18/06
See application file for complete search history.

(56) References Cited

U.S. PATENT DOCUMENTS

| | | | | |
|---|---|---|---|---|
| 3,454,505 | A | * | 7/1969 | Metzger, Jr. .......... C07F 9/4006 521/160 |
| 3,563,924 | A | * | 2/1971 | Schwarz et al. ....... C08G 18/16 521/112 |
| 6,056,900 | A | | 5/2000 | Shimizu et al. |
| 6,187,888 | B1 | | 2/2001 | Shimizu et al. |
| 7,074,847 | B2 | | 7/2006 | Doi et al. |
| 8,674,038 | B2 | | 3/2014 | Nakamura et al. |
| 9,411,231 | B2 | | 8/2016 | Ogawa et al. |
| 9,638,998 | B2 | | 5/2017 | Ogawa et al. |
| 10,620,345 | B2 | | 4/2020 | Shibayama et al. |
| 2005/0118430 | A1 | | 6/2005 | Doi et al. |

(Continued)

FOREIGN PATENT DOCUMENTS

| | | |
|---|---|---|
| JP | 11-077841 A | 3/1999 |
| JP | 2003-313215 A | 11/2003 |

(Continued)

OTHER PUBLICATIONS

International Search Report (PCT/ISA/210) dated Apr. 26, 2016, by the Japanese Patent Office as the International Searching Authority for International Application No. PCT/JP2016/053046.

(Continued)

*Primary Examiner* — Kuo Liang Peng
(74) *Attorney, Agent, or Firm* — Buchanan Ingersoll & Rooney PC

(57) ABSTRACT

There is provided a polymerizable composition for an optical material including a polyether-modified compound having a polyether group represented by General Formula (4) below, and a polymerization reactive compound.

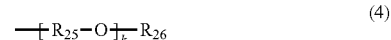

(4)

(In General Formula (4), $R_{25}$ represents a linear or branched alkylene group having 1 to 20 carbon atoms, $R_{26}$ represents a hydrogen atom, a linear or branched alkyl group having 1 to 20 carbon atoms, a linear or branched alkenyl group having 2 to 20 carbon atoms, or a linear or branched alkynyl group having 2 to 20 carbon atoms, a plurality of present $R_{25}$'s may be the same or different, and k is an integer equal to or more than 1.)

7 Claims, No Drawings

(56) References Cited

U.S. PATENT DOCUMENTS

2010/0256313 A1* 10/2010 Nakamura .............. C08L 63/00
                                                                525/476
2014/0023840 A1    1/2014  Shibayama et al.
2015/0284556 A1   10/2015  Sugiyama et al.

FOREIGN PATENT DOCUMENTS

| JP | 2006-224484 A | 8/2006 |
| JP | 2006-241447 A | 9/2006 |
| JP | 2007-090574 A | 4/2007 |
| JP | 2007-261054 A | 10/2007 |
| JP | 2009-226742 A | 10/2009 |
| JP | 2009-227801 A | 10/2009 |
| JP | 2009-256585 A | 11/2009 |
| JP | 2011-207152 A | 10/2011 |
| JP | 2013-108009 A | 6/2013 |
| JP | 2014-141033 A | 8/2014 |
| WO | 2012/133341 A1 | 10/2012 |
| WO | 2013/054771 A1 | 4/2013 |
| WO | 2014/069332 A1 | 5/2014 |

OTHER PUBLICATIONS

Written Opinion (PCT/ISA/237) dated Apr. 26, 2016, by the Japanese Patent Office as the International Searching Authority for International Application No. PCT/JP2016/053046.

Notification of Reasons for Refusal issued by the Japanese Patent Office in corresponding Japanese Patent Application No. 2016-573374 dated Feb. 20, 2018 (5 pages including partial English translation).

Extended Search Report issued by the European Patent Office in corresponding European Patent Application No. 16746617.6-1107 dated Jul. 30, 2018 (7 pages).

Office Action dated Jan. 19, 2020, by the State Intellectual Property Office of People's Republic of China in corresponding Chinese Patent Application No. 201680007562.6.

\* cited by examiner

POLYMERIZABLE COMPOSITION FOR OPTICAL MATERIAL AND OPTICAL MATERIAL AND PLASTIC LENS OBTAINABLE FROM SAME COMPOSITION

TECHNICAL FIELD

The present invention relates to a polymerizable composition for an optical material, an optical material obtainable from the same composition, and the like.

BACKGROUND ART

One of the most difficult problems to be solved when manufacturing an optical material by thermally curing a polymerizable composition which includes a polymerization reactive compound (also described below as a polymerization monomer or monomer) is striae. Striae are marks generated during the cast polymerization of monomers, or flowing marks which are cured by convection due to the influence of heat generation of monomers during polymerization, temperature difference with the surroundings, or the like. Specifically, striae are extremely likely to occur in thick items.

As a method of suppressing striae, curing may be carried out slowly over a long period of time such that the monomer does not flow, or underwater polymerization or the like may be performed to increase the heat conduction.

According to the apparatus for manufacturing a plastic lens described in Patent Document 1, it is possible to provide an apparatus for manufacturing plastic lenses which is compact and has excellent space efficiency and which is able to manufacture a plastic lens during one revolution of a mold injected with a plastic composition placed on a rotary table.

In addition, for example, there are a method in which a monomer composition is thickened to a specific range by a preliminary reaction, and then polymerized and cured by a heating polymerization program similar to a conventional manufacturing method (Patent Document 2), a method in which, in the middle of a step of polymerizing and curing a monomer composition, a molded article filled with the monomer composition is forcibly moved regularly or irregularly so as to eliminate unevenness of the monomer during curing and to suppress the generation of optical distortion or striae (Patent Document 3), a method of optimizing a temperature program when polymerizing a monomer composition (Patent Document 4), a method of holding and curing a molded article filled with a monomer composition at a specific angle from the horizontal plane when polymerizing and curing a monomer composition (Patent Document 5), a method of polymerizing by irradiation with microwaves in a state where a mold filled with a monomer composition is immersed in a liquid (Patent Document 6), and the like.

As a composition for an optical material which includes a polyether-modified compound, the techniques described in Patent Documents 7 to 9 are known.

RELATED DOCUMENT

Patent Document

[Patent Document 1] Japanese Laid-open Patent Publication No. 2006-224484
[Patent Document 2] Japanese Laid-open Patent Publication No. 2007-90574
[Patent Document 3] Japanese Laid-open Patent Publication No. 2007-261054
[Patent Document 4] Japanese Laid-open Patent Publication No. 2009-226742
[Patent Document 5] Japanese Laid-open Patent Publication No. 2011-207152
[Patent Document 6] Japanese Laid-open Patent Publication No. 2014-141033
[Patent Document 7] Japanese Laid-open Patent Publication No. H11-77841
[Patent Document 8] Japanese Laid-open Patent Publication No. 2003-313215
[Patent Document 9] Japanese Laid-open Patent Publication No. 2009-227801

SUMMARY OF INVENTION

Technical Problem

Using the related art methods described in patent documents 1 to 6 makes it possible to obtain a molded article in which the generation of striae is suppressed to a certain extent, and to produce a plastic lens in which striae are suppressed using the molded article as a base member.

However, even if curing is carried out over time to suppress striae, there are many monomer compositions with which it is difficult to suppress striae sufficiently. With such a monomer composition, even if a resin physical properties are suitable, making a product may be impossible due to striae defects and a development of such products may have to be abandoned. In addition, in a case of a thermosetting resin, since a monomer preparation liquid itself has a pot life, it may not be possible to efficiently carry out a production given that it is necessary to use the monomer preparation liquid up within the pot life. In addition, in a case of conducting underwater polymerization known in the related art, there are problems in that an expensive facility investment is necessary, a production efficiency is decreased, and the like.

Solution to Problem

As a result of intensive investigations to solve the above-mentioned problems, the present inventors found that blending a specific polyether-modified compound in a polymerizable composition remarkably reduces striae caused by convection or the like during polymerization. It was found that using a specific polyether-modified compound makes it possible to provide a polymerizable composition having a significantly longer pot life than in the related art without impairing a safety and productivity during polymerization, and to stably manufacture an extremely high quality product excellent in an appearance and physical properties, thereby completing the invention.

That is, it is possible to illustrate the present invention as follows.

[1] A polymerizable composition for an optical material including a polyether-modified compound having a polyether group represented by General Formula (4) below; and a polymerization reactive compound,

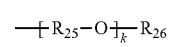

(4)

(in General Formula (4), $R_{25}$ represents a linear or branched alkylene group having 1 to 20 carbon atoms, $R_{26}$ represents a hydrogen atom, a linear or branched alkyl group having 1 to 20 carbon atoms, a linear or branched alkenyl group having 2 to 20 carbon atoms, or a linear or branched alkynyl group having 2 to 20 carbon atoms, a plurality of present $R_{25}$'s may be the same or different, and k is an integer equal to or more than 1).

[2] The polymerizable composition for an optical material according to [1], in which the polyether-modified compound is one or more compounds selected from a polyether-modified siloxane compound represented by General Formula (1) below

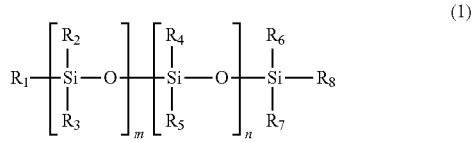

(wherein $R_1$ to $R_8$ may be the same or different and at least one of $R_1$ to $R_8$ is the polyether group represented by General Formula (4), and the other $R_1$ to $R_8$ may be the same or different and are a linear or branched alkyl group having 1 to 20 carbon atoms, a linear or branched alkoxy group having 1 to 20 carbon atoms, a hydroxyl group, or a polysiloxy group, a plurality of present $R_2$ to $R_5$ may each be the same or different, m and n are the same or different and are an integer equal to or more than 0), a polyether-modified fluoro compound represented by General Formula (2) below

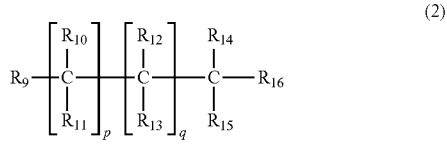

(wherein $R_9$ to $R_{16}$ may be the same or different and at least one of $R_9$ to $R_{16}$ is the polyether group represented by General Formula (4) and at least one is a fluorine atom or a linear or branched perfluoroalkyl group having 1 to 20 carbon atoms, and the other $R_9$ to $R_{16}$ represent a linear or branched alkyl group having 1 to 20 carbon atoms, a plurality of present $R_{10}$ to $R_{13}$ may each be the same or different, p and q are the same or different and are an integer equal to or more than 0), and a polyether-modified (meth)acrylic compound represented by General formula (3) below

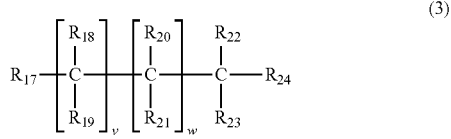

(wherein $R_{17}$ to $R_{24}$ may be the same or different, and at least one of $R_{17}$ to $R_{24}$ is the polyether group represented by General Formula (4), and at least one is a (meth)acryloyl group or a linear or branched alkyl group having 1 to 20 carbon atoms and having a (meth)acryloyl group, and the other $R_{17}$ to $R_{24}$ represent a linear or branched alkyl group having 1 to 20 carbon atoms, and a plurality of present $R_{18}$ to $R_{21}$ may each be the same or different, v and w may be the same or different and each represents an integer equal to or more than 0).

[3] The polymerizable composition for an optical material according to [2], in which the polyether-modified compound is the polyether-modified siloxane compound represented by General Formula (1).

[4] The polymerizable composition for an optical material according to anyone of [1] to [3], in which $R_{26}$ of the polyether group represented by General Formula (4) is a hydrogen atom or a linear or branched alkyl group having 1 to 20 carbon atoms.

[5] The polymerizable composition for an optical material according to anyone of [1] to [3], in which $R_{26}$ of the polyether group represented by General Formula (4) is a linear or branched alkenyl group having 2 to 20 carbon atoms or a linear or branched alkynyl group having 2 to 20 carbon atoms.

[6] The polymerizable composition for an optical material according to any one of [1] to [5], in which the polyether-modified compound is included in an amount of equal to or more than 0.01% by weight in 100% by weight of the polymerizable composition for an optical material.

[7] The polymerizable composition for an optical material according to any one of [1] to [6], in which the polymerization reactive compound is one type or two or more types of compounds selected from a polyiso(thio)cyanate compound, a poly(thio)epoxy compound, a polyoxetanyl compound, a polythietanyl compound, a poly(meth)acryloyl compound, a polyalkene compound, an alkyne compound, a poly(thi)ol compound, a polyamine compound, an acid anhydride, and a polycarboxylic acid compound.

[8] A molded article obtainable by curing the polymerizable composition for an optical material according to any one of [1] to [7].

[9] An optical material constituted of the molded article according to [8].

[10] A plastic lens formed of the optical material according to [9].

[11] A method for manufacturing an optical material, the method including a step of cast polymerizing the polymerizable composition for an optical material according to any one of [1] to [7].

[12] A plastic lens manufactured by the manufacturing method according to [11].

Advantageous Effects of Invention

Including a specific polyether-modified compound makes it to possible for the polymerizable composition for an optical material of the present invention to effectively suppress striae caused by convection generated in a cavity during polymerization. Furthermore, even in a case where the polymerizable composition for an optical material of the present invention is thickened as time passes from the preparation of the composition, the striae of the obtainable optical lens are remarkably reduced, and the yield of the product is greatly improved. Furthermore, the obtainable optical lens is excellent in qualities such as optical physical properties.

DESCRIPTION OF EMBODIMENTS

Description will be given of the polymerizable composition for an optical material according to the present invention based on the following embodiments.

The polymerizable composition for an optical material of the present embodiment includes a polyether-modified compound and a polymerization reactive compound. Description will be given below of each component.

[Polyether-Modified Compound]

In the present embodiment, a polyether-modified compound having a polyether group represented by General Formula (4) below is used as the polyether-modified compound.

(4)

In General Formula (4), $R_{25}$ represents a linear or branched alkylene group having 1 to 20 carbon atoms, $R_{26}$ represents a hydrogen atom, a linear or branched alkyl group having 1 to 20 carbon atoms, a linear or branched alkenyl group having 2 to 20 carbon atoms, and a linear or branched alkynyl group having 2 to 20 carbon atoms. A plurality of present $R_{25}$'s may be the same or different. k represents an integer of 1 or more.

It is possible to appropriately select k representing a polymerization number of a polyether moiety from an integer of 1 or more, preferably an integer of 1 to 20, and more preferably an integer of 1 to 10.

In addition, in one embodiment, from the viewpoint of improving the balance between an effect of suppressing the striae of the obtainable molded article and an effect of improving a transparency of the molded article while prolonging a pot life of the polymerizable composition, k preferably represents an integer of 1 to 1000, more preferably an integer of 40 to 600, and even more preferably an integer of 55 to 550.

In addition, in one embodiment, $R_{26}$ of the polyether group represented by General Formula (4) is preferably a hydrogen atom or a linear or branched alkyl group having 1 to 20 carbon atoms.

In addition, in one embodiment, $R_{26}$ of the polyether group represented by General Formula (4) represents a linear or branched alkenyl group having 2 to 20 carbon atoms, or a linear or branched alkynyl group having 2 to 20 carbon atoms.

In addition, in one embodiment, from the viewpoint of improving the balance between the effect of suppressing the striae of the obtainable molded article and the effect of improving the transparency of the molded article while prolonging the pot life of the polymerizable composition, $R_{26}$ of the polyether group represented by General Formula (4) is preferably a hydrogen atom or a linear or branched alkenyl group having 2 to 20 carbon atoms, more preferably a hydrogen atom or a linear or branched alkenyl group having 2 to 8 carbon atoms.

More specifically, in the present embodiment, as the polyether-modified compound, it is possible to use one or more types of compounds selected from the compounds represented by the following General Formulae (1) to (3).

Using these compounds makes it possible to more effectively suppress striae occurring in a cavity during polymerization and striae at the time of casting which accompany thickening from the end of preparation.

(Compound Represented by General Formula (1))

In the present embodiment, as the polyether-modified compound, it is possible to use a polyether-modified siloxane compound represented by General Formula (1).

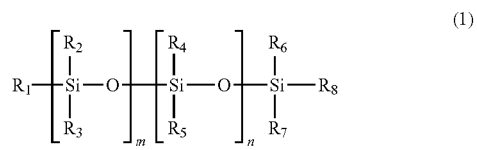
(1)

$R_1$ to $R_8$ may be the same or different and at least one of $R_1$ to $R_8$ represents the polyether group represented by General Formula (4), and the other $R_1$ to $R_8$ may be the same or different and represent a linear or branched alkyl group having 1 to 20 carbon atoms, a linear or branched alkoxy group having 1 to 20 carbon atoms, a hydroxyl group, or a polysiloxy group. A plurality of present $R_2$ to $R_5$ may each be the same or different from each other. m and n may be the same or different and are an integer equal to or more than 0, preferably an integer of 1 to 20, and more preferably an integer of 1 to 10.

(Compound Represented by General Formula (2))

In the present embodiment, it is possible to use the polyether-modified fluoro compound represented by General Formula (2) as the polyether-modified compound.

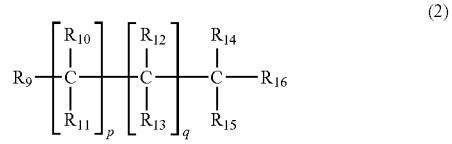
(2)

$R_9$ to $R_{16}$ may be the same or different and at least one of $R_9$ to $R_{16}$ is the polyether group represented by General Formula (4) and at least one is a fluorine atom or a linear or branched perfluoroalkyl group having 1 to 20 carbon atoms. The other $R_9$ to $R_{16}$ each represent a linear or branched alkyl group having 1 to 20 carbon atoms. A plurality of present $R_{10}$ to $R_{13}$ may be the same or different from each other.

p and q may be the same or different and are an integer equal to or more than 0, preferably an integer of 1 to 20, and more preferably an integer of 1 to 10.

(Compound represented by General Formula (3))

In the present embodiment, it is possible to use a polyether-modified (meth)acrylic compound represented by General Formula (3) below as the polyether-modified compound.

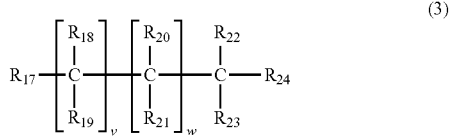
(3)

$R_{17}$ to $R_{24}$ may be the same or different, and at least one of $R_{17}$ to $R_{24}$ is the polyether group represented by General Formula (4), and at least one is a (meth)acryloyl group or a linear or branched alkyl group having a (meth)acryloyl group having 1 to 20 carbon atoms. The other $R_{17}$ to $R_{24}$ represent a linear or branched alkyl group having 1 to 20 carbon atoms. A plurality of present $R_{18}$ to $R_{21}$ may be the same or different from each other.

v and w may be the same or different and are an integer equal to or more than 0, preferably an integer of 1 to 20, and more preferably an integer of 1 to 10.

Specific examples of each of the substituents in General Formulas (1) to (4) described above are given below.

Examples of linear or branched alkylene groups having 1 to 20 carbon atoms include a methylene group, an ethylene group, an n-propylene group, an isopropylene group, an n-butylene group, an isobutylene group, a t-butylene group, an n-pentylene group, an isopentylene group, a t-pentylene group, an n-hexylene group, an n-heptylene group, an isoheptylene group, an n-octylene group, an isooctylene group, an n-nonylene group, an isononylene group, an n-decylene group, an isodecylene group, an n-undecylene group, an isoundecylene group, an n-dodecylene group, an isododecylene group, a cyclopentylene group, a cyclohexylene group, a cycloheptylene group, a cyclooctylene group, a cyclononylene group, a methylcyclopentylene group, a methylcyclohexylene group, and the like. Preferably, the linear or branched alkylene group having 1 to 20 carbon atoms is a linear or branched alkylene group having 1 to 8 carbon atoms.

Examples of linear or branched alkyl groups having 1 to 20 carbon atoms include a methyl group, an ethyl group, an n-propyl group, an isopropyl group, an n-butyl group, an isobutyl group, a t-butyl group, an n-pentyl group, an isopentyl group, a t-pentyl group, an n-hexyl group, an n-heptyl group, an isoheptyl group, an n-octyl group, an isooctyl group, an n-nonyl group, an isononyl group, an n-decyl group, an isodecyl group, an n-undecyl group, an isoundecyl group, an n-dodecyl group, an isododecyl group, a cyclopentyl group, a cyclohexyl group, a cycloheptyl group, a cyclooctyl group, a cyclononyl group, a methylcyclopentyl group, a methylcyclohexyl group, and the like.

Preferably, the linear or branched alkyl group having 1 to 20 carbon atoms is a linear or branched alkyl group having 1 to 8 carbon atoms.

Examples of linear or branched alkoxy groups having 1 to 20 carbon atoms include a methoxy group, an ethoxy group, an n-propyloxy group, an isopropyloxy group, an n-butyloxy group, an isobutyloxy group, a t-butyloxy group, an n-pentyloxy group, an isopentyloxy group, a t-pentyloxy group, an n-hexyloxy group, an n-heptyloxy group, an isoheptyloxy group, an n-octyloxy group, an isooctyloxy group, an n-nonyloxy group, an isononyloxy group, an n-decyloxy group, an isodecyloxy group, an n-undecyloxy group, an isoundecyloxy group, an n-dodecyloxy group, an isododecyloxy group, a cyclopentyloxy group, a cyclohexyloxy group, a cycloheptyloxy group, a cyclooctyloxy group, a cyclononyloxy group, a methylcyclopentyloxy group, a methylcyclohexyloxy group, and the like.

Preferably, the linear or branched alkoxy group having 1 to 20 carbon atoms is a linear or branched alkoxy group having 1 to 8 carbon atoms.

Examples of linear or branched alkenyl groups having 2 to 20 carbon atoms include a vinyl group, a 1-propenyl group, a 2-propenyl group, a 1-butenyl group, a 2-butenyl group, a 3-butenyl group, a 1-pentenyl group, a 2-pentenyl group, a 3-pentenyl group, a 4-pentenyl group, a 1-hexenyl group, a 2-hexenyl group, a 3-hexenyl group, a 4-hexenyl group, a 5-hexenyl group, a 6-heptenyl group, a 7-octenyl group, a 8-nonenyl group, a 9-decenyl group, a 2-methyl-1-propenyl group, a 2-methyl-2-propenyl group, a 3-methyl-3-butenyl group, a 4-methyl-4-pentenyl group, a 2-cyclohexyl-2-propenyl group, and the like.

Preferably, the linear or branched alkenyl group having 2 to 20 carbon atoms is a linear or branched alkenyl group having 2 to 8 carbon atoms.

Examples of linear or branched alkynyl groups having 2 to 20 carbon atoms include an ethynyl group, a 1-propynyl group, a 2-propynyl group, a 1-butynyl group, a 2-butynyl group, a 3-butynyl group, a 2-methyl-2-propynyl group, a 3-methyl-1-butynyl group, a 4-pentynyl group, a 5-hexynyl group, a 6-heptynyl group, a 7-octynyl group, an 8-nonynyl group, a 9-decynyl group, and the like.

Preferably, the linear or branched alkynyl group having 2 to 20 carbon atoms is a linear or branched alkynyl group having 2 to 8 carbon atoms.

Examples of linear or branched perfluoroalkyl groups having 1 to 20 carbon atoms include a perfluoromethyl group, a perfluoroethyl group, a perfluoro-n-propyl group, a perfluoroisopropyl group, a perfluoro-n-butyl group, a perfluoroisobutyl group, a perfluoro-t-butyl group, a perfluoro-n-pentyl group, a perfluoroisopentyl group, a perfluoro-t-pentyl group, a perfluoro-n-hexyl group, a perfluorocyclohexyl group, a perfluoro-n-heptyl group, a perfluoroisoheptyl group, a perfluoro-n-octyl group, a perfluoroisooctyl group, a perfluoro-n-nonyl group, a perfluoroisononyl group, a perfluoro-n-decyl group, a perfluoroisodecyl group, a perfluoro-n-undecyl group, a perfluoroisoundecyl group, a perfluoro-n-dodecyl group, a perfluoroisododecyl group, a perfluorocyclopentyl group, a perfluorocyclohexyl group, a perfluorocycloheptyl group, a perfluorocyclooctyl group, a perfluorocyclononyl group, a perfluoromethylcyclopentyl group, a perfluoromethylcyclohexyl group, and the like.

Preferably, the linear or branched perfluoroalkyl group having 1 to 20 carbon atoms is a linear or branched perfluoroalkyl group having 1 to 8 carbon atoms.

Examples of the compound represented by General Formula (1) include Polyflow KL-100, Polyflow KL-600, and Granol 410 (trade names, manufactured by Kyoeisha Chemical Co., Ltd.);
BYK-302, BYK-307, BYK-322, BYK-323, BYK-331, BYK-333, BYK-347, BYK-348, and BYK-349, (trade names, manufactured by BYK-Chemie);
KF-351, KF-352, KF-353, KF-354L, KF-355, KF-355A, KF-615A, andKF-618 (trade names, manufactured by Shin-Etsu Chemical Co., Ltd.);
SH3746, SH3771, SH8400, and SF8410 (trade names, manufactured by Dow Corning Toray Co., Ltd.);
TSF 4440, TSF 4445, TSF 4446, and TSF 4452 (trade names, manufactured by Toshiba Silicones Co., Ltd.); and the like, but the compound is not limited only to these exemplified compounds. These may be used alone or as a mixture of two or more types.

More preferable examples are Polyflow KL-100 and Polyflow KL-600 (trade names, manufactured by Kyoeisha Chemical Co., Ltd.).

In addition, from the viewpoint of improving the balance between the effect of suppressing the striae of the obtainable molded article and the effect of improving the transparency of the molded article while prolonging the pot life of the polymerizable composition, the compound represented by General Formula (1) is preferably one or more types selected from Polyflow KL-100 and Polyflow KL-600 (trade names, manufactured by Kyoeisha Chemical Co., Ltd.), and more preferably Polyflow KL-100.

Examples of the compound represented by General Formula (2) include Ftergent 251, 212M, 215M, 250, 209F, 222F, 245F, 208G, 218GL, 240G, 212P, 220P, 228P, FTX-218, DFX-18 (trade names, manufactured by Neos Corp.), and the like; however, the compound is not limited to these exemplified compounds. These may be used alone or as a mixture of two or more types.

Examples of the compound represented by General Formula (3) include BYK 350, 354, 355, 356, 358N, 360P, 361N, 364P, 366P, 368P, 370, 377, 378, 381, 390, 392, 394, and 399 (trade names, manufactured by BYK Japan KK), and the like; however, the compound is not limited to these exemplified compounds. These may be used alone or as a mixture of two or more types.

In the present embodiment, from the viewpoint of the effect of the present invention, it is possible to preferably use the polyether-modified siloxane compound represented by General Formula (1) as the polyether-modified compound.

In addition, from the viewpoint of improving the balance between the effect of suppressing the striae of the obtainable molded article and the effect of improving the transparency of the molded article while prolonging the pot life of the polymerizable composition, the polyether-modified compound preferably includes a compound represented by General Formula (1);
more preferably includes at least one type selected from a group consisting of the compound represented by General Formula (1), in which $R_{26}$ of the polyether group represented by General Formula (4) is a hydrogen atom, and the compound represented by General Formula (1), in which $R_{26}$ of the polyether group represented by General Formula (4) is a linear or branched alkenyl group having 2 to 20 carbon atoms; even more preferably includes at least one type selected from a group consisting of the compound represented by General Formula (1), in which $R_{26}$ of the polyether group represented by General Formula (4) is a hydrogen atom, and the compound represented by General Formula (1), in which $R_{26}$ of the polyether group represented by General Formula (4) is a linear or branched alkenyl group having 2 to 8 carbon atoms; still more preferably includes the compound represented by General Formula (1), in which $R_{26}$ of the polyether group represented by General Formula (4) is a hydrogen atom, and at least one type selected from a group consisting of the compound represented by General Formula (1), in which $R_{26}$ of the polyether group represented by General Formula (4) is a linear or branched alkenyl group having 2 to 8 carbon atoms; and
yet more preferably includes a compound represented by General Formula (6) below and a compound represented by General Formula (7) below.

obtainable molded article and the effect of suppressing the striae of the molded article, in General Formula (6) above, a+c is preferably 1 to 100, and more preferably 5 to 50.

From the same viewpoint, in General Formula (6) above, b is preferably 1 to 100, and more preferably 5 to 50.

From the same viewpoint, in General Formula (6) above, d is preferably 10 to 1000, and more preferably 50 to 500.

From the same viewpoint, in General Formula (6) above, e is preferably 1 to 100, and more preferably 5 to 50.

In addition, from the same viewpoint, the molecular weight of the compound represented by General Formula (6) above is preferably 100 to 10000, and more preferably 1000 to 5000.

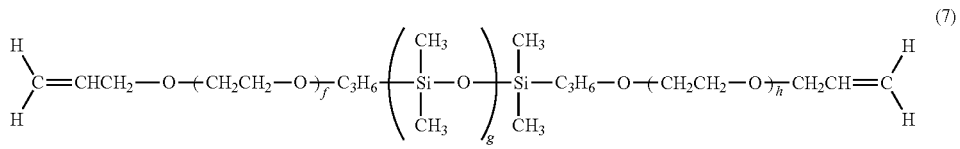

(7)

From the viewpoint of improving the balance between the effect of prolonging the pot life of the polymerizable composition, the effect of improving the transparency of the obtainable molded article and the effect of suppressing the striae of the molded article, in General Formula (7) above, f+h is preferably 1 to 100, and more preferably 1 to 20.

From the same viewpoint, in General Formula (7) above, g is preferably 1 to 100, and more preferably 1 to 10.

In addition, from the same viewpoint, the molecular weight of the compound represented by General Formula (7) above is preferably 100 to 10000, and more preferably 500 to 5000.

In addition, when the polyether-modified compound includes the compounds represented by General Formulas (6) and (7), regarding the mass ratio of the compound represented by General Formula (6) and the compound represented by General Formula (7) in the polyether-modified compound, from the viewpoint of improving the balance between the effect of prolonging the pot life of the polymerizable composition, the effect of improving the transparency of the obtainable molded article and the effect of suppressing the striae of the molded article, the mass ratio of the compound represented by General Formula (6) with respect to the mass total of the compound represented by General Formula (6) and compound represented by General Formula (7) is preferably 50% to 90%, and more preferably 60% to 80%.

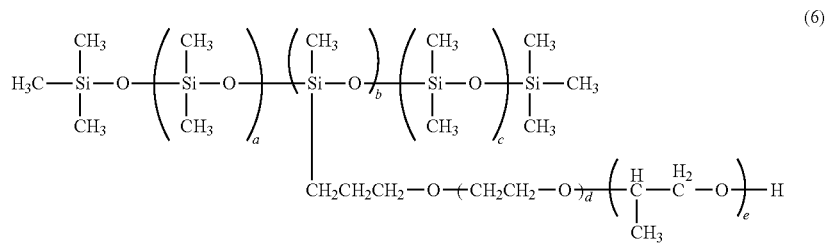

(6)

From the viewpoint of improving the balance between the effect of prolonging the pot life of the polymerizable composition, the effect of improving the transparency of the The content of the polyether-modified compound in the polymerizable composition (100% by weight) of the present embodiment is appropriately selected according to the type and combination of the polymerizable composition, the type and usage amounts of additives such as polymerization catalysts and internal release agents, various physical properties of the resin obtainable by polymerizing the polymerizable composition, and the shape of the molded article, and is in the range of 0.01% by weight or more, preferably 0.01% by weight to 7.5% by weight, without being limited thereto.

For example, in a case where a thiourethane resin is prepared by thermosetting a polymerizable composition which includes a polyisocyanate compound and a polythiol compound as polymerization reactive compounds, the content of the polyether-modified compound in the polymerizable composition is 0.01% by weight or more, preferably 0.01% by weight to 7.5% by weight, more preferably 0.10% by weight to 5.0% by weight, and even more preferably 0.5% by weight to 2.5% by weight.

[Polymerization Reactive Compound]

Next, description will be given of the polymerization reactive compound included in the polymerizable composition of the present embodiment.

The polymerization reactive compounds include polymerization reactive compounds having at least one or more polymerizable functional groups capable of self-polymerization, copolymerization, or addition polymerization in the presence or absence of additives such as initiators and catalysts added as necessary.

Regarding compounds having polymerizable functional groups capable of self-polymerization, copolymerization, or addition polymerization, more specific examples thereof include a polyiso(thio)cyanate compound having two or more isocyanato groups or isothiocyanate groups, a poly(thio)epoxy compound having two or more epoxy groups and thioepoxy groups, a polyoxetanyl compound having two or more oxetanyl groups, a polythietanyl compound having two or more thietanyl groups or an oxetanyl group and thietanyl group, a poly(meth)acryloyl compound having two or more of a methacryloyloxy group, an acryloyloxy group, a methacryloyl thio group, an acryloyl thio group, a methacrylamide group, or an acrylamide group, a polyalkene compound having two or more polymerizable carbon-carbon double bond groups other than a methacryloyloxy group, an acryloyloxy group, a methacryloylthio group, an acryloylthio group, a methacrylamide group, or an acrylamide group, an alkyne compound having one or more polymerizable carbon-carbon triple bond groups, a poly(thi)ol compound having two or more hydroxy groups or mercapto groups (not including an alcohol used as a solvent), a polyamine compound having two or more amino groups or secondary amino groups, an acid anhydride having one or more acid anhydride groups, a polycarboxylic acid compound having two or more carboxyl groups, or the like.

Examples of polyiso(thio)cyanate compounds include aliphatic polyisocyanate compounds such as tetramethylene diisocyanate, pentamethylene diisocyanate, hexamethylene diisocyanate, pentamethylene diisocyanate, octamethylene diisocyanate, 2,2,4-trimethylhexamethylene diisocyanate, 2,4,4-trimethylhexamethylene diisocyanate, lysine diisocyanato methyl ester, lysine triisocyanate, and xylylene diisocyanate; alicyclic polyisocyanate compounds such as isophoronediisocyanato, bis (isocyanatomethyl) cyclohexane, bis (isocyanatocyclohexyl) methane, dicyclohexyldimethylmethane isocyanate, 2,5-bis (isocyanatomethyl) bicyclo-[2.2.1]-heptane, 2,6-bis (isocyanatomethyl) bicyclo-[2.2.1]-heptane, 3,8-bis (isocyanatomethyl) tricyclodecane, 3,9-bis (isocyanatomethyl) tricyclodecane, 4,8-bis (isocyanatomethyl) tricyclodecane, and 4,9-bis (isocyanatomethyl) tricyclodecane;

aromatic polyisocyanate compounds such as tolylene diisocyanate, 4,4'-diphenylmethane diisocyanate, diphenyl sulfide-4,4-diisocyanate, and phenylene diisocyanate;

heterocyclic polyisocyanate compounds such as 2,5-diisocyanatothiophene, 2,5-bis (isocyanatomethyl) thiophene, 2,5-diisocyanatotetrahydrothiophene, 2,5-bis (isocyanatomethyl) tetrahydrothiophene, 3,4-bis (isocyanatomethyl) tetrahydrothiophene, 2,5-diisocyanato-1,4-dithiane, 2,5-bis (isocyanatomethyl)-1,4-dithiane, 4,5-diisocyanato-1,3-dithiolane, and 4,5-bis (isocyanatomethyl)-1,3-dithiolane;

aliphatic polyisothiocyanate compounds such as hexamethylene diisothiocyanate, lysine diisothiocyanate methyl ester, lysine triisothiocyanate, m-xylylene diisothiocyanate, bis (isothiocyanatomethyl) sulfide, bis (isothiocyanatoethyl) sulfide, and bis (isothiocyanatoethyl) disulfide;

alicyclic polyisothiocyanate compounds such as isophorone diisothiocyanate, bis (isothiocyanatomethyl) cyclohexane, bis (isothiocyanatocyclohexyl) methane, cyclohexane diisothiocyanate, methylcyclohexane diisothiocyanate, 2,5-bis (isothiocyanatomethyl) bicyclo-[2.2.1]-heptane, 2,6-bis (isothiocyanatomethyl) bicyclo-[2.2.1]-heptane, 3,8-bis (isothiocyanatomethyl) tricyclodecane, 3,9-bis (isothiocyanatomethyl) tricyclodecane, 4,8-bis (isothiocyanatomethyl) tricyclodecane, and 4,9-bis (isothiocyanatomethyl) tricyclodecane;

aromatic polyisothiocyanate compounds such as tolylene diisothiocyanate, 4,4-diphenylmethane diisothiocyanate, and diphenyl disulfide-4,4-diisothiocyanate; and sulfur-containing heterocyclic polyisothiocyanate compounds such as 2,5-diisothiocyanatothiophene, 2,5-bis (isothiocyanatomethyl) thiophene, 2,5-isothiocyanatotetrahydrothiophene, 2,5-bis (isothiocyanatomethyl) tetrahydrothiophene, 3,4-bis (isothiocyanatomethyl) tetrahydrothiophene, 2,5-diisothiocyanato-1,4-dithiane, 2,5-bis (isothiocyanatomethyl)-1,4-dithiane, 4,5-diisothiocyanato-1,3-dithiolane, and 4,5-bis (isothiocyanatomethyl)-1,3-dithiolane; and the like.

Examples of poly(thio)epoxy compounds include polyepoxy compounds such as bisphenol A diglycidyl ether; chain aliphatic 2,3-epoxypropylthio compounds such as bis (2,3-epoxypropyl) sulfide, bis (2,3-epoxypropyl) disulfide, bis (2,3-epoxypropylthio) methane, 1,2-bis (2,3-epoxypropylthio) ethane, 1,2-bis (2,3-epoxypropylthio) propane, 1,3-bis (2,3-epoxypropylthio) propane, 1,3-bis (2,3-epoxypropylthio)-2-methylpropane, 1,4-bis (2,3-epoxypropylthio) butane, 1,4-bis (2,3-epoxypropylthio)-2-methylbutane, 1,3-bis (2,3-epoxypropylthio) butane, 1,5-bis (2,3-epoxypropylthio) pentane, 1,5-bis (2,3-epoxypropylthio)-2-methylpentane, 1,5-bis (2,3-epoxypropylthio)-3-thiapentane, 1,6-bis (2,3-epoxypropylthio) hexane, 1,6-bis (2,3-epoxypropylthio)-2-methylhexane, 3,8-bis (2,3-epoxypropylthio)-3,6-dithiaoctane, 1,2,3-tris (2,3-epoxypropylthio) propane, 2,2-bis (2,3-epoxypropylthio)-1,3-bis (2,3-epoxypropylthiomethyl) propane, 2,2-bis (2,3-epoxypropylthiomethyl)-1-(2,3-epoxypropylthio) butane, 1,5-bis (2,3-epoxypropylthio)-2-(2,3-epoxypropylthiomethyl)-3-thiapentane, 1,5-bis (2,3-epoxypropylthio)-2,4-bis (2,3-epoxypropylthiomethyl)-3-thiapentane, 1-(2,3-epoxypropylthio)-2,2-bis (2,3-epoxypropylthiomethyl)-4-thiahexane, 1,5,6-tris (2,3-epoxypropylthio)-4-(2,3-epoxypropylthiomethyl)-3-thiahexane, 1,8-bis (2,3-epoxypropylthio)-4-(2,3-epoxy propylthiomethyl)-3,6-dithiaoctane, 1,8-bis (2,3-epoxypropylthio)-4,5-bis (2,3-epoxypropylthiomethyl)-3,6-dithiaoctane, 1,8-bis (2,3- epoxypropylthio)-4,4-bis (2,3-epoxypropylthiomethyl)-3,6-dithiaoctane, 1,8-bis (2,3-epoxypropylthio)-2,5-bis (2,3-epoxypropylthiomethyl)-3,6-dithiaoctane, 1,8-bis (2,3-epoxypropylthio)-2,4,5-tris (2,3-epoxy propylthiomethyl)-3,6-dithiaoctane, 1,1,1-tris [[2-(2,3-epoxypropylthio) ethyl] thiomethyl]-2-(2,3-epoxypropylthio) ethane, 1,1,2,2-tetrakis [[2-(2,3-epoxypropylthio) ethyl] thiomethyl] ethane, 1,11-bis (2,3-epoxypropylthio)-4,8-bis (2,3-epoxypropylthiomethyl)-3,6,9-trithiaundecane, 1,11-bis (2,3-epoxypropylthio)-4,7-bis (2,3-epoxypropylthiomethyl)-3,6,9-trithiaundecane, and 1,11-bis (2,3-epoxypropylthio)-5,7-bis (2,3-epoxypropylthiomethyl)-3,6,9-trithiaundecane;

cyclic aliphatic 2,3-epoxypropylchio compounds such as 1,3-bis (2,3-epoxypropylthio) cyclohexane, 1,4-bis (2,3-epoxypropylthio) cyclohexane, 1,3-bis (2,3-epoxypropylthiomethyl) cyclohexane, 1,4-bis (2,3-epoxypropylthiomethyl) cyclohexane, 2,5-bis (2,3-epoxypropylthiomethyl)-1,4-dithiane, 2,5-bis [[2-(2,3-epoxypropylthio) ethyl] thiomethyl]-1,4-dithiane, and 2,5-bis (2,3-epoxypropylthiomethyl)-2,5-dimethyl-1,4-dithiane; and aromatic 2,3-epoxypropylthio compounds such as 1,2-bis (2,3-epoxypropylthio) benzene, 1,3-bis (2,3-epoxypropylthio) benzene, 1,4-bis (2,3-epoxypropylthio) benzene, 1,2-bis (2,3-epoxypropylthiomethyl) benzene, 1,3-bis (2,3-epoxypropylthiomethyl) benzene, 1,4-bis (2,3-epoxypropylthiomethyl) benzene, bis [4-(2,3-epoxypropylthio) phenyl] methane, 2,2-bis [4-(2,3-epoxypropylthio) phenyl] propane, bis [4-(2,3-epoxypropylthio) phenyl] sulfide, bis [4-(2,3-epoxypropylthio) phenyl] sulfone, 4,4'-bis (2,3-epoxypropylthio) biphenyl; and the like.

Examples of polyoxetanyl compounds include 3-ethyl-3-hydroxymethyloxetane, 1,4-bis {[(3-ethyl-3-oxetanyl) methoxy] methyl} benzene, 3-ethyl-3-(phenoxymethyl) oxetane, di [1-ethyl-(3-oxetanyl)] methyl ether, 3-ethyl-3-(2-ethylhexyloxymethyl) oxetane, phenol novolac oxetane, and the like.

Examples of polythietanyl compounds include 1-{4-(6-mercaptomethylthio)-1,3-dithianylthio}-3-{2-(1,3-dithiet anyl)} methyl-7,9-bis (mercaptomethylthio)-2,4,6,10-tetrathiaundecane, 1,5-bis {4-(6-mercaptomethylthio)-1,3-dithianylthio}-3-{2-(1,3-dithietan yl)} methyl-2,4-dithiapentane, 4,6-bis [3-{2-(1,3-dithietanyl)} methyl-5-mercapto-2,4-dithiapentylthio]-1,3-dithiane, 3-{2-(1,3-dithietanyl)} methyl-7,9-bis (mercaptomethylthio)-1,11-dimercapto-2,4,6,10-tetrathiaundecane, 9-{2-(1,3-dithietanyl)} methyl-3,5,13,15-tetrakis (mercaptomethylthio)-1,17-dimercapto-2,6,8,10,12,16-hexathiahept adecane, 3-{2-(1,3-dithietanyl)} methyl-7,9,13,15-tetrakis (mercaptomethylthio)-1,17-dimercapto-2,4,6,10,12,16-hexathiahept adecane, 3,7-bis {2-(1,3-dithietanyl)} methyl-1,9-dimercapto-2,4,6,8-tetrathianonane, 4,5-bis [1-{2-(1,3-dithietanyl)}-3-mercapto-2-thiapropylthio]-1,3-dithio lane, 4-[1-{2-(1,3-dithietanyl)}-3-mercapto-2-thiapropylthio]-5-{1,2-b is(mercaptomethyl thio)-4-mercapto-3-thiabutylthio}-1,3-dithiolane, 4-{4-(5-mercaptomethyl thio-1,3-dithiolanyl) thio}-5-[1-{2-(1,3-dithietanyl)}-3-mercapto-2-thiapropylthio]-1, 3-dithiolane, and the like.

Examples of poly(meth)acryloyl compounds include diacryloyl compounds such as ethylene glycol diacrylate, 1,3-butylene glycol diacrylate, 1,4-butanediol diacrylate, 1,6-hexanediol diacrylate, cyclohexane dimethanol diacrylate, alkoxylated hexanediol diacrylate, neopentyl glycol diacrylate, caprolactone modified neopentyl glycol hydroxypivalate diacrylate, cyclohexane dimethanol diacrylate, diethylene glycol diacrylate, dipropylene glycol diacrylate, bisphenol A diacrylate, ethoxylated bisphenol A diacrylate, hydroxy pivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecane dimethanol diacrylate, triethylene glycol diacrylate, tripropylene glycol diacrylate; triacryloyl compounds such as glycerol triacrylate, ethoxylated trimethylolpropane triacrylate, pentaerythritol triacrylate, propoxylated glyceryl triacrylate, propoxylated trimethylolpropane triacrylate, and tris (2-hydroxyethyl) isocyanuratetriacrylate; and tetraacryloyl compounds such as ditrimethylolpropane tetraacrylate, dipentaerythritol pentaacrylate, ethoxylated pentaerythritol tetraacrylate, pentaerythritol tetraacrylate, caprolactone modified dipentaerythritol hexaacrylate; and the like.

Examples of polyalkene compounds include polyethylene, polypropylene, polyisobutylene, diethylene glycol bis (allyl carbonate), divinylbenzene, and the like.

Examples of alkyne compounds include hydrocarbon-based alkynes such as 2-butyne, 2-pentyne, 2-hexyne, 3-hexyne, 2-heptyne, 3-heptyne, 2-octyne, 3-octyne, 4-octyne, diisopropylacetylene, 2-nonyne, 3-nonyne, 4-nonyne, 5-nonyne, 2-decyne, 3-decyne, 4-decyne, 5-decyne, di-tert-butylacetylene, diphenylacetylene, dibenzylacetylene, methyl-iso-propylacetylene, methyl-tert-butylacetylene, ethyl-iso-propylacetylene, ethyl-tert-butylacetylene, n-propyl-iso-propyl acetylene, n-propyl-tert-butyl acetylene, phenyl methyl acetylene, phenyl ethyl acetylene, phenyl-n-propylacetylene, phenyl-iso-propylacetylene, phenyl-n-butyl acetylene, and phenyl-tert-butyl acetylene; alkynyl alcohols such as acetylene diol, propynol, butynol, pentynol, hexynol, hexynediol, heptynol, heptynediol, octynol, and octynediol; alkynylamines of which some or all of the OH groups of the alkynyl alcohols are substituted with an $NH_2$ group, and the like.

Among the poly(thi)ol compounds (not including alcohols used as solvents), examples of polyol compounds include aliphatic polyols such as ethylene glycol, diethylene glycol, propylene glycol, dipropylene glycol, tripropylene glycol, butylene glycol, neopentyl glycol, glycerin, trimethyiolethane, trimethylolpropane, ditrimethylolpropane, butanetriol, 1,2-methylglucoside, pentaerythritol, dipentaerythritol, tripentaerythritol, sorbitol, erythritol, threitol, ribitol, arabinitol, xylitol, allitol, mannitol, dolcitol, iditol, glycol, inositol, hexanetriol, triglycerol, diglycerol, triethylene glycol, polyethylene glycol, tris (2-hydroxyethyl) isocyanurate, cyclobutanediol, cyclopentanediol, cyclohexanediol, cycloheptanediol, cyclooctanediol, cyclohexanedimethanol, hydroxypropylcyclohexanol, tricyclo [$5.2.1.0^{2,6}$] decane-dimethanol, bicyclo [4.3.0]-nonanediol, dicyclohexanediol, tricyclo [5.3.1.1] dodecanediol, bicyclo [4.3.0] nonanedimethanol, tricyclo [5.3.1.1] dodecane diethanol, hydroxypropyltricyclo [5.3.1.1] dodecanol, spiro [3.4] octanediol, butylcyclohexanediol, 1,1'-bicyclohexylidene diol, cyclohexanetriol, maltitol, and lactose;

aromatic polyols such as dihydroxy naphthalene, trihydroxynaphthalene, tetrahydroxynaphthalene, dihydroxybenzene, benzenetriol, biphenyltetraol, pyrogallol, (hydroxynaphthyl) pyrogallol, trihydroxyphenanthrene, bisphenol A, bisphenol F, xylylene glycol, di (2-hydroxyethoxy) benzene, bisphenol A-bis-(2-hydroxyethyl ether), tetrabromobisphenol A, and tetrabromobisphenol A-bis-(2-hydroxyethyl ether);

halogenated polyols such as dibromoneopentyl glycol; and polymer polyols such as epoxy resins. In the present embodiment, it is possible to use at least one type selected from the above in a combination.

In addition, as the polyol compound, it is also possible to use other polyol compounds such as condensation reaction products of organic acids such as oxalic acid, glutamic acid, adipic acid, acetic acid, propionic acid, cyclohexane carboxylic acid, β-oxocyclohexane propionic acid, dimer acid, phthalic acid, isophthalic acid, salicylic acid, 3-bromopropionic acid, 2-bromoglycol, dicarboxycyclohexane, pyromellitic acid, butanetetracarboxylic acid, and bromophthalic acid and the above polyols;

addition reaction products of the polyols above and alkylene oxides such as ethylene oxide or propylene oxide;

addition reaction products of an alkylene polyamine and an alkylene oxide such as ethylene oxide or propylene oxide;

furthermore, bis-[(4-hydroxyethoxy) phenyl] sulfide, bis-[4-(2-hydroxypropoxy) phenyl] sulfide, bis-[4-(2,3-dihydroxypropoxy) phenyl] sulfide, bis-[4-(4-hydroxycyclohexyloxy) phenyl] sulfide, bis-[2-methyl-4-(hydroxyethoxy)-6-butylphenyl] sulfide and compounds where ethylene oxide and/or propylene oxide having an average of 3 molecules or less per hydroxyl group are added to these compounds; and polyols containing sulfur atoms such as di-(2-hydroxyethyl) sulfide, 1,2-bis-(2-hydroxyethylmercapto) ethane, bis (2-hydroxyethyl) disulfide, 1,4-dithiane-2,5-diol, bis (2,3-dihydroxypropyl) sulfide, tetrakis (4-hydroxy-2-thiabutyl) methane, bis (4-hydroxy phenyl) sulfone (bisphenol S), tetrabromobisphenol S, tetramethyl bisphenol S, 4,4'-thiobis (6-tert-butyl-3-methylphenol), 1,3-bis (2-hydroxyethylthioethyl)-cyclohexane; and the like. In the present embodiment, it is possible to use at least one type selected from the above in a combination.

Examples of polythiol compounds include aliphatic polythiol compounds such as methanedithiol, 1,2-ethanedithiol, 1,2,3-propanetrithiol, 1,2-cyclohexanedithiol, bis (2-mercaptoethyl) ether, tetrakis (mercaptomethyl) methane, diethylene glycol bis (2-mercaptoacetate), diethylene glycol bis (3-mercaptopropionate), ethylene glycol bis (2-mercaptoacetate), ethylene glycol bis (3-mercaptopropionate), trimethylolpropane tris (2-mercaptoacetate), trimethylolpropane tris (3-mercaptopropionate), trimethylolethane tris (2-mercaptoacetate), trimethylolethane tris (3-mercaptopropionate), pentaerythritol tetrakis (2-mercaptoacetate), pentaerythritol tetrakis (3-mercaptopropionate), bis (mercaptomethyl) sulfide, bis (mercaptomethyl) disulfide, bis (mercaptoethyl) sulfide, bis (mercaptoethyl) disulfide, bis (mercaptopropyl) sulfide, bis (mercaptomethylthio) methane, bis (2-mercaptoethylthio) methane, bis (3-mercaptopropylthio) methane, 1,2-bis (mercaptomethylthio) ethane, 1,2-bis (2-mercaptoethylthio) ethane, 1,2-bis (3-mercaptoproylthio) ethane, 1,2,3-tris (mercaptomethylthio) propane, 1,2,3-tris (2-mercaptoethylthio) propane, 1,2,3-tris (3-mercaptopropylthio) propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis (mercaptomethylthiomethyl) methane, tetrakis (2-mercaptoethylthiomethyl) methane, tetrakis (3-mercaptopropylthiomethyl) methane, bis (2,3-dimercaptopropyl) sulfide, 2,5-dimercaptomethyl-1,4-dithiane, 2,5-dimercapto-1,4-dithiane, 2,5-dimercaptomethyl-2,5-dimethyl-1,4-dithiane and esters of these thioglycolic acids and mercaptopropionic acids, hydroxymethyl sulfide bis (2-mercaptoacetate), hydroxymethyl sulfide bis (3-mercaptopropionate), hydroxyethyl sulfide bis (2-mercaptoacetate), hydroxyethyl sulfide bis (3-mercaptopropionate), hydroxymethyl disulfide bis (2-mercaptoacetate), hydroxyethyl disulfide bis (3-mercaptopropinate), hydroxyethyl disulfide bis (2-mercaptoacetate), hydroxyethyl disulfide bis (3-mercaptopropionate), 2-mercaptoethyl ether bis (2-mercaptoacetate), 2-mercaptoethyl ether bis (3-mercaptopropionate), thiodiglycolic acid bis (2-mercaptoethyl ester), thiodipropionic acid bis (2-mercaptoethyl ester), dithiodiglycolic acid bis (2-mercaptoethyl ester), dithiodipropionic acid bis (2-mercaptoethyl ester), 1,1,3,3-tetrakis (mercaptomethylthio) propane, 1,1,2,2-tetrakis (mercaptomethylthio) ethane, 4,6-bis (mercaptomethylthio)-1,3-dithiane, tris (mercaptomethylthio) methane, and tris (mercaptoethylthio) methane;

aromatic polythiol compounds such as 1,2-dimercaptobenzene, 1,3-dimercaptobenzene, 1,4-dimercaptobenzene, 1,2-bis (mercaptomethyl) benzene, 1,3-bis (mercaptomethyl) benzene, 1,4-bis (mercaptomethyl) benzene, 1,2-bis (mercaptoethyl) benzene, 1,3-bis (mercaptoethyl) benzene, 1,4-bis (mercaptoethyl) benzene, 1,3,5-trimercaptobenzene, 1,3,5-tris (mercaptomethyl) benzene, 1,3,5-tris (mercaptomethyleneoxy) benzene, 1,3,5-tris (mercaptoethyleneoxy) benzene, 2,5-toluenedithiol, 3,4-toluenedithiol, 1,5-naphthalenedithiol, and 2,6-naphthalenedithiol; and heterocyclic polythiol compounds such as 2-methylamino-4,6-dithiol-sym-triazine, 3,4-thiophenedithiol, bismuthiol, 4,6-bis (mercaptomethylthio)-1,3-dithiane, 2-(2,2-bis (mercaptomethylthio) ethyl)-1,3-dithiane; and the like.

Examples of polyamine compounds include primary polyamine compounds such as ethylenediamine, 1,2-or 1,3-diaminopropane, 1,2-, 1,3-, or 1,4-diaminobutane, 1,5-diaminopentane, 1,6-diaminohexane, 1,7-diaminoheptane, 1,8-diaminooctane, 1,10-diaminodecane, 1,2-, 1,3-, or 1,4-diaminocyclohexane, o-, m-or p-diaminobenzene, 3,4- or 4,4'-diaminobenzophenone, 3,4- or 4,4'-diaminodiphenyl ether, 4,4'-diaminodiphenylmethane, 4,4'-diaminodiphenyl sulfide, 3,3'- or 4,4'-diaminodiphenylsulfone, 2,7-diaminofluorene, 1,5-, 1,8-, or 2,3-diaminonaphthalene, 2,3-, 2,6-, or 3,4-diaminopyridine, 2,4- or 2,6-diaminotoluene, m- or p-xylylenediamine, isophoronediamine, diaminomethylbicycloheptane, 1,3- or 1,4-diaminomethylcyclohexane, 2- or 4-aminopiperidine, 2- or 4-aminomethylpiperidine, 2- or 4-aminoethylpiperidine, N-aminoethylmorpholine, and N-aminopropylmorpholine;

monofunctional secondary amine compounds such as diethylamine, dipropylamine, di-n-butylamine, di-sec-butylamine, diisobutylamine, di-n-pentylamine, di-3-pentylamine, dihexylamine, dioctylamine, di (2-ethylhexyl) amine, methyl hexyl amine, diallylamine, N-methylallylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine, and morpholine; and secondary polyamine compounds such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diamino hexane, N,N'-dimethyl-1,7-diaminoheptane, N,N'-diethylethylenediamine, N,N'-diethyl-1,2-diaminopropane, N,N'-diethyl-1,3-diamino propane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, N,N'-diethyl-1,7-diaminoheptane, piperazine, 2-methylpiperazine, 2,5-dimethylpiperazine, 2,6-dimethylpiperazine, homopiperazine, 1,1-di-(4-piperidyl) methane, 1,2-di-(4-piperidyl) ethane, 1,3-di-(4-piperidyl) propane, 1,4-di-(4-piperidyl) butane, and tetramethylguanidine; and the like.

Examples of acid anhydrides include succinic anhydride, phthalic anhydride, maleic anhydride, tetrabromophthalic anhydride, tetrahydrophthalic anhydride, trimellitic anhydride, or dodecylsuccinic anhydride, and the like.

Examples of polycarboxylic acid compounds include succinic acid, adipic acid, sebacic acid, azelaic acid, dodecanedioic acid, terephthalic acid, isophthalic acid, orthophthalic acid, phthalic anhydride, tetrahydrophthalic acid, hexahydrophthalic acid, naphthalenedicarboxylic acid, biphenyl dicarboxylic acid, dimer acid, trimellitic acid, pyromellitic acid, c-caprolactone, and the like.

These polymerization reactive compounds may be used alone or in a mixture of two or more types.

From the viewpoint of improving the quality such as optical physical properties for the obtainable optical lens, the polymerization reactive compound is preferably one type or two or more types of compounds selected from a polyiso(thio)cyanate compound, a poly(thio) epoxy compound, a polyoxetanyl compound, a polythietanyl compound, a poly(meth)acryloyl compound, a polyalkene compound, an alkyne compound, a poly(thi)ol compound, a polyamine compound, an acid anhydride, or a polycarboxylic acid compound.

More detailed description will be given of the polymerization reactive compound included in the composition of the present embodiment. It is possible to classify the polymerization reactive compounds described above into (Group A) and (Group B) depending on reactivity.

(Group A): It is possible to classify a polyiso(thio)cyanate compound, a poly(thio) epoxy compound, a polyoxetanyl compound, a polythietanyl compound, a poly(meth)acryloyl compound, a polyalkene compound, or an alkyne compound into (Group A) as a self-polymerizable or copolymerizable compound. However, the following (Group B) is not included in (Group A).

(Group B): It is possible to classify a poly(thi)ol compound, a polyamine compound, an acid anhydride, or a polycarboxylic acid compound into (Group B) as an addition polymerizable compound. However, (Group A) described above is not included in (Group B).

In a case where the polymerization reactive compound described above is used alone, any one type selected from (Group A) or (Group B) is selected. In a case where the polymerization reactive compound described above is used alone (one type), one type selected from the self-polymerizable or copolymerizable compound (Group A) is preferable because this type is more easily cured than one type selected from the addition polymerizable compounds (Group B).

In a case where two or more types of the polymerization reactive compounds described above are used, examples include a method for mixing two or more types selected only from (Group A), two or more types selected only from (Group B), or one or more types selected from (Group A) and one or more types selected from (Group B).

The polyiso(thio)cyanate compound classified as a self-polymerizable or copolymerizable compound is tends to be lower in self-polymerizable or copolymerization reactivity with the (Group A) compounds than the other compounds classified in (Group A); however, if a condition is selected, a self-polymerization reaction type polymer such as a 1-nylon type polymer and an isocyanurate type polymer may be obtained. Furthermore, in the copolymerization with a poly(thio)epoxy compound, an ethylene carbonate type copolymer may be obtained.

Although polymerizability is generally not high even with two or more types selected from the addition polymerizable (Group B) only, in a case where an acid anhydride and a poly(thi)ol compound are combined, a case where an acid anhydride and a polyamine compound are combined, or a case where three types of an acid anhydride, a poly(thi)ol compound and a polyamine compound are combined, the polymerization reaction tends to proceed easily and a cured resin tends to be obtained. The blending ratio of acid anhydride and poly(thi)ol or polyamine is in a range of approximately 8/2 to 2/8, preferably in the range of 6/4 to 4/6, and more preferably in the range of 55/45 to 45/55 in the functional group molar ratio of the acid anhydride group of the acid anhydride/the mercapto group of the poly(thi)ol (or amino group of polyamine).

When the blending ratio in a case of using both (Group A) and (Group B) is represented by the functional group molar ratio of the polymerizable functional group of (Group A)/polymerizable functional group of (Group B), the mixing ratio is approximately 999/1 to 1/9, preferably in the range of 99/1 to 10/90, more preferably in the range of 9/1 to 3/7, and most preferably in the range of 7/3 to 4/6.

In the present embodiment, from the viewpoint of improving the balance between an effect of prolonging the pot life of the polymerizable composition, an effect of improving the transparency of the obtainable molded article and an effect of suppressing striae in the molded article, as examples of combinations of the polyether-modified compound and the polymerization reactive compound in the polymerizable composition, it is preferable that the polyether-modified compound include a compound, preferably represented by General Formula (1);

it is more preferable that the polyether-modified compound include at least one type selected from a group consisting of the compound represented by General Formula (1), in which $R_{26}$ of the polyether group represented by General Formula (4) is a hydrogen atom, and the compound represented by General Formula (1), in which $R_{26}$ of the polyether group represented by General Formula (4) is a linear or branched alkenyl group having 2 to 20 carbon atoms;

it is even more preferable that the polyether-modified compound include at least one type selected from a group consisting of the compound represented by General Formula (1), in which $R_{26}$ of the polyether group represented by General Formula (4) is a hydrogen atom, and the compound represented by General Formula (1), in which $R_{26}$ of the polyether group represented by General Formula (4) is a linear or branched alkenyl group having 2 to 8 carbon atoms;

it is still more preferable that the polyether-modified compound include the compound represented by General Formula (1), in which $R_{26}$ of the polyether group represented by General Formula (4) is a hydrogen atom, and at least one type selected from a group consisting of the compound represented by General Formula (1), in which $R_{26}$ of the polyether group represented by General Formula (4) is a linear or branched alkenyl group having 2 to 8 carbon atoms;

it is yet more preferable that the polyether-modified compound include a compound represented by General Formula (6) and a compound represented by the above-described General Formula (7);

the polymerization reactive compound is preferably one type or two or more types selected from polyiso(thio)cyanate compounds, poly(thio)epoxy compounds, polyoxetanyl compounds, polythietanyl compounds, poly(meth)acryloyl compounds, polyalkene compounds, alkyne compounds, poly(thi)ol compounds, polyamine compounds, acid anhydrides, or polycarboxylic acid compounds;

more preferably includes a polyiso(thio)cyanate compound; and even more preferably is a combination including a polyiso(thio)cyanate compound and a poly(thi)ol compound.

[Other Components Such as Additives]

The composition of the present embodiment may include components other than the polymerization reactive compound described above. Examples thereof include monofunctional iso(thio) cyanate compounds, monofunctional (thio)epoxy compounds, monofunctional oxetanyl compounds, monofunctional thietanyl compounds, monofunctional (meth)acryloyl compounds having one functional group optionally selected from methacryloyloxy groups, acryloyloxy groups, methacryloylthio groups, acryloylthio groups, methacrylamide groups, and acrylamide groups, monofunctional alkene compounds having one polymerizable carbon-carbon double bond other than methacryloyloxy groups, acryloyloxy groups, methacryloylthio groups, acryloylthio groups, methacrylamide group, or acrylamide groups, monofunctional alcohol compounds other than alcohol which is used as a solvent, monofunctional thiol compounds, monofunctional amine compounds having one functional group optionally selected from amino groups and secondary amino groups, monofunctional carboxylic acid compounds having one carboxyl group, solvents, moisture and the like.

However, when a large amount of residual solvent and moisture remain in the composition at the time of manufacturing the molded article of the present embodiment by cast polymerization, air bubbles are likely to occur during injection and polymerization curing and the air bubbles will be fixed (solidified) inside the molded article at the end, thus the solvent and water are preferably not included as much as possible in the composition including the polymerization reactive compound. Accordingly, the amount of the solvent and water included in the composition of the present embodiment immediately before injection into a cavity is preferably at least 20% by weight or less, more preferably 5% by weight or less, and even more preferably 1% by weight or less.

Examples of solvents highly likely to be included in the composition of the present embodiment include and solvents mixed by various routes such as reaction solvents remaining in the internal release agent, reaction solvents remaining in the polymerizable compound, solvents added for the purpose of lowering the viscosity of the composition, and solvents added for dissolving various additives for the purpose of improving operability.

Examples of solvents which are likely to remain include water such as moisture, alcohols such as methanol, ethanol, 1-propanol, isopropanol, 1-butanol, isobutanol, t-butanol, 1-pentanol, 2-pentanol, 3-pentanol, isopentanol, 1-hexanol, 2-ethylhexanol, 1-octanol, 2-methoxy ethanol, and 1-methoxy-2-propanol, ketones such as acetone, methyl ethyl ketone, methyl-n-propyl ketone, methyl isopropyl ketone, methyl-n-butyl ketone, methyl isobutyl ketone, and cyclohexanone, esters such as ethyl acetate, n-propyl acetate, isopropyl acetate, n-butyl acetate, and isobutyl acetate, carbonates such as diethyl carbonate, ethylene carbonate, and 1,2-propylene carbonate, ethers such as diethyl ether, di-n-propyl ether, diisopropyl ether, di-n-butyl ether, tetrahydrofuran, and dioxane, aliphatic hydrocarbons such as n-hexane, cyclohexane, and methylcyclohexane, aromatic hydrocarbons such as benzene, toluene, and xylene, nitrogen-containing compounds such as N,N-dimethylformamide, N,N-dimethylacetamide, n-methylpyrrolidone, and nitrobenzene, halogen-containing compounds such as dichloromethane, chloroform, dichloroethane, 1,1,2-trichloro-1,1,2-trifluoroethane, and 1,1,2,2-tetrachloro-1,2-difluoroethane, and the like.

In the process of cast polymerizing the composition of the present embodiment to manufacture a molded article, as necessary, a polymerization catalyst or a thermal polymerization initiator is added in a case of curing by heat, and a photopolymerization initiator is added in a case of curing by radiation other than with infrared (heat), such as ultraviolet rays.

Examples of polymerization catalysts include a Lewis acid, amines, tertiary amine compounds and inorganic acid salts or organic acid salts thereof, metal compounds, quaternary ammonium salts, organic sulfonic acids, and the like.

The usage amount of the polymerization catalyst with respect to the polymerizable composition is preferably in the range of 5 ppm to 15% by weight, more preferably in the range of 10 ppm to 10% by weight, and even more preferably in the range of 50 ppm to 3% by weight.

Examples of metal compounds used as polymerization catalysts include dimethyltin chloride, dibutyltin chloride, dibutyltin laurate, and the like.

Examples of the thermal polymerization initiator to be used include ketone peroxide compounds such as methyl isobutyl ketone peroxide and cyclohexanone peroxide;

diacyl peroxide compounds such as isobutyryl peroxide, o-chlorobenzoyl peroxide, and benzoyl peroxide;

dialkyl peroxide compounds such as tris (t-butylperoxy) triazine and t-butyl cumyl peroxide;

peroxyketal compounds such as 1,1-di (t-hexylperoxy) cyclohexane, 2,2-bis (4,4-di-t-butylperoxycyclohexyl) propane, and 2,2-di (t-butylperoxy) butane;

alkyl per ester compounds such as α-cumyl peroxyneodecanoate, t-butyl peroxypivalate, 2,4,4-trimethylpentyl peroxy-2-ethyl hexanoate, t-butyl peroxy-2-ethyl hexanoate, and t-butyl peroxy-3,5,5-trimethyl hexanoate; and peroxycarbonate compounds such as di-3-methoxybutyl peroxydicarbonate, bis (4-t-butylcyclohexyl) peroxydicarbonate, t-butylperoxy isopropyl carbonate, and diethylene glycol bis (t-butylperoxycarbonate); and the like.

Examples of the photopolymerization initiator to be used include a photoradical polymerization initiator, a photocationic polymerization initiator, a photoanionic polymerization initiator, and the like, and, among these photopolymerization initiators, a photoradical polymerization initiator is preferable.

Examples of photoradical polymerization initiators include Irgacure 127 (manufactured by BASF), Irgacure 651 (manufactured by BASF), Irgacure 184 (manufactured by BASF), Darocure 1173 (manufactured by BASF), benzophenone, 4-phenyl benzophenone, Irgacure 500 (manufactured by BASF), Irgacure 2959 (manufactured by BASF), Irgacure 907 (manufactured by BASF), Irgacure 369 (manufactured by BASF), Irgacure 1300 (manufactured by BASF), Irgacure 819 (manufactured by BASF), Irgacure 1800 (manufactured by BASF), Darocure TPO (manufactured by BASF), Darocure 4265 (manufactured by BASF), Irgacure OXE 01 (manufactured by BASF), Irgacure OXE 02 (manufactured by BASF), Esacure KT 55 (manufactured by Lamberti), Esacure ONE (manufactured by Lamberti), Esacure KIP 150 (manufactured by Lamberti), Esacure KIP 100 F (manufactured by Lamberti), Esacure KT 37 (manufactured by Lamberti), Esacure KTO 46 (manufactured by Lamberti), Esacure 1001M (manufactured by Lamberti), Esacure KIP/EM (manufactured by Lamberti), Esacure DP250 (manufactured by Lamberti), Esacure KB 1 (manufactured by Lamberti), 2,4-diethylthioxanthone, and the like.

Among these photoradical polymerization initiators, Irgacure 127 (manufactured by BASF), Irgacure 184 (manufactured by BASF), Darocure 1173 (manufactured by BASF), Irgacure 500 (manufactured by BASF), Irgacure 819 (manufactured by BASF), Darocure TPO (manufactured by BASF), Esacure ONE (manufactured by Lamberti), Esacure KIP 100 F (manufactured by Lamberti), Esacure KT 37 (manufactured by Lamberti), Esacure KTO 46 (manufactured by Lamberti), and the like are preferable.

Examples of photocationic polymerization initiators include Irgacure 250 (manufactured by BASF), Irgacure 784 (manufactured by BASF), Esacure 1064 (manufactured by Lamberti), CYRAURE UVI 6990 (manufactured by Union Carbide Japan Ltd.), Adeka Optomer SP-172 (manufactured by ADEKA), Adeka Optomer SP-170 (manufactured by ADEKA), Adeka Optomer SP-152 (manufactured by ADEKA), and Adeka Optomer SP-150 (manufactured by ADEKA).

In a case where the photopolymerization initiator is used, a photopolymerization accelerator may be used in combination therewith. Examples of photopolymerization accelerators include 2,2-bis (2-chlorophenyl)-4,5'-tetraphenyl-2'H-<1,2'> biimidazoleyl, tris (4-dimethylaminophenyl) methane, 4,4'-bis (dimethylamino) benzophenone, 2-ethyl-anthraquinone, camphorquinone, and the like.

The usage amount of the photopolymerization initiator and the thermal polymerization initiator in the polymerizable composition is preferably in the range of 0.1 to 20% by weight, more preferably in the range of 0.5 to 10% by weight, and even more preferably in the range of 1 to 5% by weight.

In the process of cast polymerizing the composition of the present embodiment to manufacture a molded article, an internal release agent may be added as necessary.

As the internal release agent, it is possible to use an acidic phosphate ester. Examples of acidic phosphate esters include phosphoric monoesters and phosphoric acid diesters, which may be used alone or in a combination of two or more types.

It is possible to represent the acidic phosphate ester used as an internal release agent by General Formula (5).

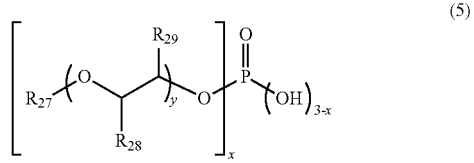

(5)

In General Formula (5), x represents an integer of 1 or 2, y represents an integer of 0 to 18, $R_{27}$ represents an alkyl group having 1 to 20 carbon atoms, $R_{28}$ and $R_{29}$ each independently represents a hydrogen atom, a methyl group, or an ethyl group. The number of carbon atoms in [ ] x is preferably 4 to 20. A plurality of present $R_{27}$, a plurality of present $R_{28}$, or a plurality of present $R_{29}$ may be the same or different from each other.

Examples of $R_{27}$ in General Formula (5) include organic residues derived from linear aliphatic compounds such as methane, ethane, propane, butane, pentane, hexane, heptane, octane, nonane, decane, undecane, dodecane, tetradecane, and hexadecane; organic residues derived from branched aliphatic compounds such as 2-methylpropane, 2-methylbutane, 2-methylpentane, 3-methylpentane, 3-ethylpentane, 2-methylhexane, 3-methylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, and 4-propyloctane; and organic residues derived from alicyclic compounds such as cyclopentane, cyclohexane, 1,2-dimethylcyclohexane, 1,3-dimethylcyclohexane, and 1,4-dimethylcyclohexane, and it is possible to use at least one type selected from the above. Note that the present invention is not limited only to these exemplified compounds. It is possible to use at least one type or a mixture of two or more types of acidic phosphate esters.

In General Formula (5) described above, y is preferably 0 or 1.

In a case where y is 0, $R_{27}$ is preferably a linear or branched alkyl group having 4 to 12 carbon atoms, and more preferably a linear alkyl group having 4 to 12 carbon atoms.

In a case where y is 1, $R_{27}$ is preferably a linear or branched alkyl group having 1 to 20 carbon atoms, and is preferably a linear or branched alkyl group having 3 to 12 carbon atoms.

It is possible to use the acidic phosphate ester as one type or a mixture of two or more types selected from the above.

Examples of acidic phosphate esters include ZelecUN (manufactured by STEPAN), internal release agents for MR (manufactured by Mitsui Chemicals, Inc.), the JP series manufactured by Johoku Chemical Co., Ltd., the phosphanol series manufactured by Toho Chemical Industry Co., Ltd., the AP and DP series manufactured by Daihachi Chemical Industry Co., Ltd., and ZelecUN (manufactured by STEPAN Co.), and internal release agents for MR (manufactured by Mitsui Chemicals, Inc.) are more preferable.

In order to prevent the molded article formed of the cured resin of the present embodiment from deteriorating even when exposed to the outside for a long period of time, it is desirable to further add an ultraviolet absorber and a hindered amine light stabilizer to the composition of the present embodiment and have a composition imparted with weatherability.

The ultraviolet absorber described above is not limited, and, for example, it is possible to use various ultraviolet absorbers such as a benzotriazole type ultraviolet absorber, a triazine type ultraviolet absorber, a benzophenone type ultraviolet absorber, a benzoate type ultraviolet absorber, a propanedioic acid ester type ultraviolet absorber, or an oxanilide type ultraviolet absorber.

Specific examples thereof include benzotriazole-based ultraviolet absorbers such as 2-(2H-benzotriazol-2-yl)-4-methyl-6-(3,4,5,6-tetrahydrophthalimidylmethyl) phenol, 2-(2H-benzotriazole-2-yl)-p-cresol, 2-(2H-benzotriazole-2-yl)-4-tert-butylphenol, 2-(2H-benzotriazole-2-yl)-4,6-di-tert-butylphenol, 2-(2H-benzotriazole-2-yl)-4,6-bis (1-methyl-1-phenyl ethyl) phenol, 2-(2H-benzotriazole-2-yl)-4-(1,1,3,3-tetramethylbutyl)-6-(1-methyl-1-phenyl ethyl) phenol, 2-(2H-benzotriazole-2-yl)-4-(3-on-4-oxa-dodecyl)-6-tert-butyl-phenol, 2-{5-chloro (2H)-benzotriazole-2-yl}-4-(3-on-4-oxa-dodecyl)-6-tert-butyl-phenol, 2-{5-chloro(2H)-benzotriazole-2-yl}-4-methyl-6-tert-butyl-phenol, 2-(2H-benzotriazole-2-yl)-4,6-di-tert-pentylphenol, 2-{5-chloro (2H)-benzotriazole-2-yl}-4,6-di-tert-butylphenol, 2-(2H-benzotriazole-2-yl)-4-tert-octylphenol, 2-(2H-benzotriazole-2-yl)-4-methyl-6-n-dodecyl phenol, 3-[3-tert-butyl-5-(5-chloro-2H-benzotriazole-2-yl)-4-hydroxyphenyl] octyl propionic acid, 3-[3-tert-butyl-5-(5-chloro-2H-benzotriazole-2-yl)-4-hydroxyphenyl] propionic acid 2-ethylhexyl, reaction product of methyl-3-{3-(2H-benzotriazole-2-yl)-5-tert-butyl-4-hydroxy-phenyl}propionate/polyethylene glycol 300, trade name Viosorb 583

(manufactured by Kyodo Chemical Co., Ltd.), trade name Tinuvin 326 (manufactured by BASF), trade name Tinuvin 384-2 (manufactured by BASF), trade name Tinuvin PS (manufactured by BASF), trade name Seesorb 706 (manufactured by Shipro Kasei Kaisha, Ltd.), and trade name Eversorb 109 (manufactured by Everlight Chemical Industrial Corp.); triazine-based ultraviolet absorbers such as 2-(4-phenoxy-2-hydroxy-phenyl)-4,6-diphenyl-1,3,5-triazine, 2-(2-hydroxy-4-oxa-hexadecyloxy)-4,6-di(2,4-dimethyl-phenyl)-1,3,5-triazine, 2-(2-hydroxy-4-oxa-heptadecyloxy)-4,6-di(2,4-dimethyl-phenyl)-1,3,5-triazine, 2-(2-hydroxy-4-iso-octyloxy-phenyl)-4,6-di(2,4-dimethyl-phenyl)-1,3,5-triazine, trade name Tinuvin 400 (manufactured by BASF), trade name Tinuvin 405 (manufactured by BASF), trade name Tinuvin 460 (manufactured by BASF), and trade name Tinuvin 479 (manufactured by BASF); benzophenone-based ultraviolet absorbers such as 2-hydroxy-4-n-methoxybenzophenone and 2-hydroxy-4-n-octoxybenzophenone; benzoate-based ultraviolet absorbers such as 2,4-di-tert-butyl phenyl-3,5-di-tert-butyl-4-hydroxy benzoate; propanedioic acid ester-based ultraviolet absorbers such as propanedioic acid-{(4-methoxyphenyl)-methylene}-dimethyl ester, trade name Hostavin PR-25 (manufactured by Clariant Japan Co., Ltd.), and trade name Hostavin B-CAP (manufactured by Clariant Japan Co., Ltd.); and oxanilide-based ultraviolet absorbers such as 2-ethyl-2'-ethoxy-oxanilide, trade name Sanduvor VSU (manufactured by Clariant Japan Co., Ltd.); and the like. Among these ultraviolet absorbers, benzotriazole and triazine-based ultraviolet absorber tend to be preferable.

The hindered amine light stabilizers (abbreviated to HALS) described above are not limited; however, in general, there are many cases where hindered amine light stabilizers are expressed as a generic name of compounds having a 2,2,6,6-tetramethylpiperidine skeleton and there are broadly classified into low molecular weight HALS, medium molecular weight HALS, high molecular weight HALS, and reactive type HALS depending on the molecular weight.

Specific examples of hindered amine light stabilizers include trade name Tinuvin 111 FDL (manufactured by BASF), bis (1-octyloxy-2,2,6,6-tetramethyl-4-piperidyl) sebacate (trade name Tinuvin 123 (manufactured by BASF)), trade name Tinuvin 144 (manufactured by BASF), trade name Tinuvin 292 (manufactured by BASF), trade name Tinuvin 765 (manufactured by BASF), trade name Tinuvin 770 (manufactured by BASF), N,N'-bis (3-aminopropyl) ethylenediamine-2,4-bis [N-butyl-N-(1,2,2,6,6-pentamethyl-4-piperidyl) amino]-6-chloro-1,3,5-triazine condensate (trade name CHIMASSORB 119 FL (manufactured by BASF)), trade name CHIMASSORB 2020 FDL (manufactured by BASF), dimethyl succinate-1-(2-hydroxyethyl)-4-hydroxy-2,2,6,6-tetramethylpiperidine polycondensate (trade name CHIMASSORB 622 LD (manufactured by BASF)), poly[{6-(1,1,3,3-tetramethyl-butyl) amino-1,3,5-triazin-2,4-diyl} {(2,2,6,6-tetramethyl-4-piperidyl) imino} hexamethylene {(2,2,6,6-tetramethyllauryl-4-piperidyl) imino}] (trade name CHIMASSORB 944 FD (manufactured by BASF)), trade name Sanduvor 3050 Liq. (manufactured by Clariant Japan Co., Ltd.), trade name Sanduvor 3052 Liq. (manufactured by Clariant Japan Co., Ltd.), trade name Sanduvor 3058 Liq. (manufactured by Clariant Japan Co., Ltd.), trade name Sanduvor 3051 Powder. (manufactured by Clariant Japan Co., Ltd.), trade name Sanduvor 3070 Powder. (manufactured by Clariant Japan Co., Ltd.), trade name VP Sanduvor PR-31 (manufactured by Clariant Japan Co., Ltd.), trade name Hostavin N 20 (manufactured by Clariant Japan Co., Ltd.), trade name Hostavin N 24 (manufactured by Clariant Japan Co., Ltd.), trade name Hostavin N 30 (manufactured by Clariant Japan Co., Ltd.), trade name Hostavin N 321 (manufactured by Clariant Japan Co., Ltd.), trade name Hostavin PR-31 (manufactured by Clariant Japan Co., Ltd.), trade name Hostavin 845 (manufactured by Clariant Japan Co., Ltd.), trade name NYLO STAB S-EED (manufactured by Clariant Japan Co., Ltd.), and the like.

The addition amount of the ultraviolet absorber and the hindered amine light stabilizer is not limited; however, in the polymerizable composition, the ultraviolet absorber is usually an amount of 0.1 to 20% by weight, and preferably 0.5 to 10% by weight, while the hindered amine light stabilizer is usually in the range of 0.1 to 10% by weight, preferably 0.5 to 5% by weight, and more preferably 1 to 3% by weight. In a case where the addition amounts of the ultraviolet absorber and the hindered amine light stabilizer are within the ranges described above, the effect of improving the weather resistance of the cured resin obtainable by polymerizing the composition of the present embodiment and the molded article formed of the resin is increased. In a case where the addition amounts of the ultraviolet absorber and the hindered amine light stabilizer are less than the ranges described above, the effect of improving the weather resistance of the obtainable molded article may be reduced in some cases. On the other hand, in a case where the addition amounts of the ultraviolet absorbers and the hindered amine light stabilizers exceed the ranges described above, there may be an insufficiency when the composition containing the polymerization reactive compound is polymerized with radiation such as W.

Further, a light control dye or a light control coloring agent may be added for the purpose of imparting light control properties. It is possible to use one or two or more types from representative light-control dyes or light-control coloring agents from spiropyran compounds, spirooxazine compounds, fulgide compounds, naphthopyran compounds, and bisimidazole compounds, according to the desired coloration.

Examples of spiropyran compounds include substituents in which the indole ring and benzene ring of indolinospirobenzopyran are substituted with a halogen, methyl, ethyl, methylene, ethylene, a hydroxyl group, or the like, substituents in which the indole ring and naphthalene ring of indolinospiro naphthopyran are substituted with a halogen, methyl, ethyl, methylene, ethylene, a hydroxyl group, or the like, substituents in which the indole ring of indolinospiroquinolinopyran is substituted with a halogen, methyl, ethyl, methylene, ethylene, a hydroxyl group or the like, substituents in which the indole ring of indolinospiropyridopyran is substituted with a halogen, methyl, ethyl, methylene, ethylene, a hydroxyl group, or the like, and the like.

Examples of spirooxazine compounds include substituents in which an indole ring and a benzene ring of indolinospirobenzoxazine are substituted with halogen, methyl, ethyl, methylene, ethylene, a hydroxyl group, or the like, substituents in which the indole ring and naphthalene ring of indolinospironaphthooxazine are substituted with a halogen, methyl, ethyl, methylene, ethylene, a hydroxyl group, or the like, substituents in which the indole ring of indolinospirophenanthroxazine is substituted with a halogen, methyl, ethyl, methylene, ethylene, a hydroxyl group, or the like, substituents in which an indole ring of indolinospiroquinolino oxazine is substituted with a halogen, methyl, ethyl, methylene, ethylene, a hydroxyl group, or the like, substituents in which a piperidine ring and a naphthalene ring of piperidinospiro naphthooxazine are substituted with a halogen, methyl, ethyl, methylene, ethylene, a hydroxyl group, or the like, and the like.

Examples of fulgide type compounds include N-cyanomethyl-6,7-dihydro-4-methyl-2-phenylspiro (5,6-benzo [b] thiophenedicarboximido-7,2'-tricyclo [3.3.1.1$^{3,7}$] decane], N-cyanomethyl-6,7-dihydro-2-(p-methoxyphenyl)-4-methylspiro (5,6-benzo [b] thiophenedicarboximide-7,2'-tricyclo [3.3.1.1$^{3,7}$] decane), 6,7-dihydro-N-methoxycarbonylmethyl-4-methyl-2-phenylspiro (5,6-benzo [b] thiophenedicarboximide-7,2'-tricyclo [3.3.1.1$^{3,7}$] decane), 6,7-dihydro-4-methyl-2-(p-methylphenyl)-N-nitromethylspiro (5,6-benzo [b] thiophene dicarboximide-7,2'-tricyclo [3.3.1.1$^{3,7}$] decane), N-cyanomethyl-6,7-dihydro-4-cyclopropyl-3-methylspiro (5,6-benzo [b] thiophenedicarboximide-7,2'-tricyclo [3.3.1.1$^{3,7}$] decane), N-cyanomethyl-6,7-dihydro-4-cyclopropylspiro (5,6-benzo [b] thiophenedicarboximide-7, 2'-tricyclo [3.3.1.1$^{3,7}$] decane), N-cyanomethyl-6,7-dihydro-2-(p-methoxyphenyl)-4-cyclopropyl spiro (5,6-benzo [b] thiophenedicarboximido-7,2'-tricyclo [3.3.1.1$^{3,7}$] decane), and the like.

Examples of naphthopyran-based compounds include spiro [norbornane-2,2'-[2H] benzo [h] chromene], spiro [bicyclo [3.3.1] nonane-9,2'-[2H] benzo [h] chromene], 7'-methoxyspiro [bicyclo [3.3.1] nonane-9,2'-[2H] benzo [h] chromene], 7'-methoxyspi [norbornane-2,2'-[2H] benzo [f] chromene], 2,2-dimethyl-7-octoxy [2H] benzo [h] chromene, Spiro [2-bicyclo [3.3.1] nonene-9,2'-[2H] benzo [h] chromene], Spiro [2-bicyclo [3.3.1] nonene-9,2'-[2H] benzo [f] chromene], 6-morpholino-3,3-bis (3-fluoro-4-methoxyphenyl)-3H-benzo (f) chromene, 5-isopropyl-2,2-diphenyl-2H-benzo (h) chromene, and the like.

The amount of these light control dyes or light control coloring agents to be added is not limited, but is in the range of approximately 0.01 to 10000 ppm (by weight) with respect to the composition which includes the polymerization reactive compound, preferably 0.1 to 1000 ppm (by weight), and more preferably in the range of 1 to 100 ppm (by weight).

The composition of the present embodiment may further contain, as necessary, various additives such as a polymerization accelerator, a catalyst, an infrared absorber, a radical scavenger, an antioxidant, a polymerization inhibitor, a non-light control coloring agent and dye, a binder, a dispersant, an antifoaming agent, and nanometer-sized organic or inorganic particles.

A cured resin obtainable by thermally polymerizing (curing) the composition of the present embodiment and a molded article formed of the resin are manufactured by adding a polymerization reactive compound and various additives and the like as described above as necessary. In addition, a polymerization reactive compound and additives and the like not described in this application may be added to the composition of the present embodiment within a range not impairing the effect of the present embodiment.

The cured resin forming the molded article of the present embodiment is preferably a cured resin obtainable from a liquid polymerizable composition with which it is easy to carryout a casting operation and, among such cured resins, the cured resins in (a) to (z) below are preferable.

(a) A poly(thio)urethane resin obtainable by polymerizing a polyiso(thio)cyanate compound and a poly(thi)ol compound In the present application, poly(thio)urethane resin means a polyurethane resin, a polythiourethane resin, or a polydithiourethane resin.

(b) A poly(thio) urea resin obtainable by polymerizing a polyisocyanate compound or a polyisothiocyanate compound and a polyamine compound In the present application, poly(thio)urea resin means a polyurea resin or a polythiourea resin.

(c) A poly(thio)epoxy resin obtainable by polymerizing a poly(thio)epoxy compound (d) a poly(thio)epoxy-poly(thi)ol resin obtainable by polymerizing a poly(thio)epoxy compound and a poly(thi)ol compound (e) A poly(thio)epoxy-polyamine resin obtainable by polymerizing a poly(thio)epoxy compound and a polyamine compound (f) A poly(thio)epoxy-acid anhydride resin obtainable by polymerizing a poly(thio)epoxy compound and an acid anhydride (g) A poly(meth)acryloyl resin obtainable by polymerizing a poly(meth)acryloyl compound (h) A poly(meth)acryloyl-poly(thi)ol resin obtainable by polymerizing a poly(meth)acryloyl compound and a poly(thi)ol compound (i) A poly(meth)acryl-polyalkene resin obtainable by polymerizing a poly(meth)acryloyl compound and a polyalkene compound (j) A poly(meth)acryl-polyalkyne resin obtainable by polymerizing a poly(meth)acryloyl compound and an alkyne compound (k) A poly(meth)acryl-polyamine resin obtainable by polymerizing a poly(meth)acryloyl compound and a polyamine compound (l) A polyalkene resin obtainable by polymerizing a polyalkene compound (m) A polyalkene-poly(thi)ol resin obtainable by polymerizing a polyalkene compound and a poly(thi)ol compound (n) A polyalkene-polyamine resin obtainable by polymerizing a polyalkene compound and a polyamine compound (o) A polyalkyne resin obtainable by polymerizing an alkyne compound (p) A polyalkyne-poly(thi)ol resin obtainable by polymerizing an alkyne compound and a poly(thi)ol compound (q) A polyalkyne-polyamine resin obtainable by polymerizing an alkyne compound and a polyamine compound (r) A polyalkyne-polyalkene resin obtainable by polymerizing an alkyne compound and a polyalkene compound (s) A polyoxetanyl resin obtainable by polymerizing a polyoxetanyl compound (t) A polyoxetanyl-poly(thi)ol resin obtainable by polymerizing a polyoxetanyl compound and a poly(thi)ol compound (u) A polyoxetanyl-polyamine resin obtainable by polymerizing a polyoxetanyl compound and a polyamine compound (v) A polyoxetanyl-acid anhydride resin obtainable by polymerizing a polyoxetanyl compound and an acid anhydride (w) A polythietanyl-poly(thi)ol resin obtainable by polymerizing a polythietanyl compound and a poly(thi)ol compound (x) A polythietanyl-polyamine resin obtainable by polymerizing a polythietanyl compound and a polyamine compound (y) A polythietanyl-acid anhydride resin obtainable by polymerizing a polythietanyl compound and an acid anhydride (z) A mixed resin obtainable by copolymerizing two or more types selected from (a) to (y)

Among the curable resins (a) to (z) described above, examples of more preferable cured resins include the resins described in (a) to (i) and (s) to (z) and mixed resins thereof (mixtures of copolymers and resins) and examples of even more preferable cured resins include the cured resins described in (a) to (f), (s) to (v), and (z) and mixed resins thereof.

<Optical Material>

In the present embodiment, it is possible to obtain molded articles of various shapes by changing the mold during polymerization. It is possible to use the molded article of the present embodiment as various optical materials by forming the molded article into a desired shape and providing a coating layer or other member formed as necessary.

In addition, the method for manufacturing an optical material in the present embodiment includes, for example, a step of cast polymerizing the polymerizable composition of the present embodiment.

Examples of the optical material include a plastic lens, a light emitting diode (LED), a prism, an optical fiber, an information recording substrate, a filter, a light emitting diode, and the like. Specifically, the optical material is suitable as a plastic lens.

Below, description will be given of a plastic lens formed of the molded article of the present embodiment. It is possible to manufacture the plastic lens as follows.

<Method for Manufacturing Plastic Lens>

The plastic lens of the present embodiment is usually manufactured by a cast polymerization method using the composition described above.

Specifically, first, a polyether-modified compound is added to a composition which includes a polymerization reactive compound, mixed and stirred, and subjected to defoaming under reduced pressure as necessary.

For example, in a case of manufacturing a poly(thio)urethane resin from a polyiso(thio)cyanate compound and a poly(thi)ol compound, the solubility of the polyether-modified compound with respect to the poly(thi)ol compound may be low, thus a method in which the poly(thi)ol compound is mixed in after completely dissolving the polyether-modified compound in the polyiso(thio)cyanate compound in advance is preferable.

The obtained composition of the present embodiment is injected into a cavity made of a glass mold and a gasket or a tape and heated or irradiated with radiation such as ultraviolet rays other than infrared rays to polymerize and cure the composition, so as to manufacture the cured resin of the present embodiment and a plastic lens formed of this resin.

In a case of manufacturing the cured resin of the present embodiment and the plastic lens formed of this resin by heating, for the purpose of preventing polymerization unevenness (striae) due to convection, the heating is usually carried out by gradually heating from a low temperature so as to carry out the polymerization over several days. Examples of typical heating conditions include gradually increasing from a low temperature in the range of 0° C. to 200° C. for 64 hours, similarly in the range of 5° C. to 150° C. for 40 hours, and similarly in the range of 20° C. to 120° C. for 16 hours.

Likewise, in a case of polymerization by radiation such as UV, in order to prevent polymerization unevenness (striae) due to convection, the irradiation of the radiation is usually carried out in parts or an irradiation intensity is lowered to gradually carry out polymerization. For the purpose of further preventing convection from occurring, a dual cure method or the like may be employed in which a uniform polymerizable reaction composition is injected into a cavity and then cooled once to form a state in which convection does not easily occur, and a semi-cured composition formed in a uniform gel state by being irradiated with weak radiation is completely cured by heating.

The plastic lens obtained by releasing from the mold may be subjected to a reheat treatment (annealing) as necessary for the purpose of completing polymerization or removing distortion due to residual stress. Usually, a heat treatment is carried out at a temperature of Tg to Tg×2 times of the obtained plastic lens in the range of 1 to 24 hours. Heat treatment conditions of a temperature of Tg to Tg×1.5 times for 1 to 16 hours are more preferable and heat treatment conditions of a temperature of Tg to Tg×1.2 times for 1 to 4 hours are even more preferable.

In a case of manufacturing the cured resin of the present embodiment and a plastic lens made of the resin using radiation, energy rays having a wavelength region in the range of 0.0001 to 800 nm are usually used as the radiation to be used. The radiation is classified into α rays, β rays, y rays, X-rays, electron rays, ultraviolet rays, visible rays, and the like and it is possible to appropriately select and use the radiation according to the composition of the mixture. Among these radiations, ultraviolet rays are preferable, and the output peak of ultraviolet rays is preferably in the range of 200 to 450 nm, more preferably in the range of 230 to 445 nm, even more preferably in the range of 240 to 430 nm, and further preferably in the range of 250 to 400 nm. In a case of using ultraviolet rays within the range of the output peak described above, there are few problems such as yellowing and thermal deformation during polymerization and, even when an ultraviolet absorber is added, it is possible to complete the polymerization in a relatively short time.

In addition, in a case where an ultraviolet absorber and a hindered amine stabilizer are added to the composition described above, it is preferable to use ultraviolet rays having an energy output peak of ultraviolet rays in the range of 250 to 280 nm or 370 to 430 nm.

In this manner, the obtained cured resin of the present embodiment and the plastic lens formed of the resin may be provided with a functional coating layer such as a hard coat, an antireflection coat, a dimming coat, a coat imparting a slipping property or a treatment imparting a slipping property, or an electrostatic prevention coat on the surface of the resin or the plastic lens, and may be subjected to a dyeing treatment for imparting fashionability, a treatment such as surface and edge polishing, or a processing for imparting various types of functionality by placing a polarizing film therein or attaching a polarizing film to the surface in order to impart a polarizing property thereto, and the like.

Furthermore, for the purpose of improving the adhesion between the functional coating layer and the base member, it is also possible for the surface of the obtained cured resin of the present embodiment and the plastic lens formed of the resin to be subjected to a corona treatment, an ozone treatment, a low-temperature plasma treatment using an oxygen gas or a nitrogen gas, a glow discharge treatment, an oxidation treatment using chemicals or the like, a physical or chemical treatment such as a flame treatment.

In addition, instead of these treatments or in addition to these treatments, a primer layer formed by a primer treatment, an undercoat treatment, an anchor coat treatment, or the like may be provided between the surface of the cured resin of the present embodiment and the plastic lens formed of the resin and the outermost layer (atmospheric contact surface) formed by the physical or chemical treatments described above.

As the coating agent used for the primer layer described above, for example, it is possible to use a coating agent having a main component of a vehicle of a resin such as a polyester resin, a polyamide resin, a polyurethane resin, an epoxy resin, a phenol resin, a (meth)acrylic resin, a polyvinyl acetate resin, polyolefin resins such as polyethylene and polypropylene, copolymers or modified resins thereof, and cellulose resins. The coating agent may be either a solvent type coating agent or an aqueous type coating agent.

Among these coating agents, preferable examples include modified polyolefin-based coating agents, ethyl vinyl alcohol-based coating agents, polyethylene imine-based coating agents, polybutadiene-based coating agents, and polyurethane-based coating agents;
polyester-based polyurethane emulsion coating agents, polyvinyl chloride emulsion coating agents, urethane acrylic emulsion coating agents, silicone acrylic emulsion coating agents, vinyl acetate acrylic emulsion coating agents, and acrylic emulsion coating agents; and
styrene-butadiene copolymer latex coating agents, acrylonitrile-butadiene copolymer latex coating agents, a methyl methacrylate-butadiene copolymer latex coating agents, chloroprene latex coating agents, rubber-based latex coating agents of polybutadiene latex, polyacrylic acid ester latex coating agents, polyvinylidene chloride latex coating agents, polybutadiene latex coating agents, or coating agents formed of a carboxylic acid modified latex or dispersion of a resin included in these latex coating agents.

It is possible to coat these coating agents using for example, a dip coating method, a spin coating method, a spray coating method, and the like and the coating amount on a base member is usually 0.05 g/m² to 10 g/m² in a dry state.

Among these coating agents, a polyurethane coating agent is more preferable. The polyurethane-based coating agent has urethane bonds in the main chain or side chain of the resin included in the coating agent. The polyurethane coating agent is, for example, a coating agent which includes a polyurethane obtainable by reacting a polyol such as a polyester polyol, a polyether polyol, or an acrylic polyol with an isocyanate compound.

Among these polyurethane-based coating agents, a polyurethane-based coating agent obtainable by mixing a polyester polyol such as a condensation type polyester polyol and a lactone type polyester polyol with an isocyanate compound such as tolylene diisocyanate, hexamethylene diisocyanate, or xylene diisocyanate is preferable due to having an excellent adhesion.

The method of mixing the polyol compound and the isocyanate compound is not limited. The blending ratio is also not limited; however, if the amount of the isocyanate compound is excessively small, curing failure may occur, thus the OH group of the polyol compound and the NCO group of the isocyanate compound are preferably in the range of 2/1 to 1/40 in terms of equivalent amounts.

The cured resin of the present embodiment may be applied to applications other than plastic lenses and examples other than plastic lenses include sheets and films and the like manufactured in the same manner as the plastic lens using a flat mold. The surface of a sheet or a film or the like formed of the cured resin of the present embodiment may be physically or chemically treated in the same manner as the plastic lens or the primer layer and a functional outermost layer (atmospheric contact surface) formed by a physical or chemical treatment or the like may be disposed thereon.

The plastic lens formed of the cured resin of the present embodiment may be a layered product including the primer layer described above between the functional outermost layer (atmospheric contact surface) formed by the above physical or chemical treatment and the like and the cured resin surface.

It is possible to use the obtainable plastic lens of the present embodiment for various lens applications such as eyeglass lenses, camera lenses, pickup lenses, Fresnel lenses, prism lenses, and lenticular lenses. Among these, examples of more preferable applications are eyeglass lenses, camera lenses, and pickup lenses, with smooth surfaces. Fresnel lenses and prism lenses with a complicated shape whose surface is not smooth are likely to generate air bubbles near the interface with the mold (near the lens surface after releasing), and multi-layered lenticular lenses or the like are difficult to make uniform near the multi-layer interface, thus these are applications requiring further improvements in addition to the internal release agent of the present embodiment.

It is possible to use the sheet and film of the present embodiment obtainable in the same manner as various planar member applications requiring high transparency such as display members such as a flat panel or a smartphone panel, film members such as a scattering prevention film, a specific wavelength cut film, or a decorating film, and glass substitute members such as a building material window glass, a vehicle window glass, or mirrors.

The present invention includes the following aspects.

A1. A polymerizable composition for an optical material including a polyether-modified compound and a polymerization reactive compound.

A2. The polymerizable composition for an optical material according to the above item A1, in which the polyether-modified compound is one or more compounds selected from a polyether-modified siloxane compound represented by General Formula (1) below

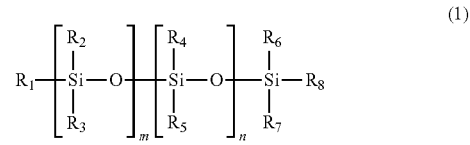

(wherein $R_1$ to $R_8$ may be the same or different and at least one of $R_1$ to $R_8$ is a polyether group, and the other $R_1$ to $R_8$ may be the same or different and are a linear or branched alkyl group having 1 to 20 carbon atoms, a linear or branched alkoxy group having 1 to 20 carbon atoms, a hydroxyl group, or a polysiloxy group; plurality of present $R_2$ to $R_5$ may each be the same or different; m and n may be the same or different and are an integer equal to or more than 0), a polyether-modified fluoro compound represented by General Formula (2) below

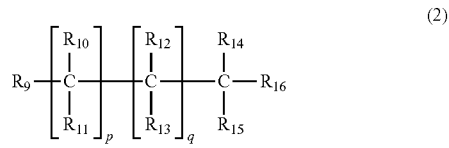

(wherein $R_9$ to $R_{16}$ may be the same or different and at least one of $R_9$ to $R_{16}$ is a polyether group and at least one is a fluorine atom or a linear or branched perfluoroalkyl group having 1 to 20 carbon atoms, and the other $R_9$ to $R_{16}$ represent a linear or branched alkyl group having 1 to 20 carbon atoms; a plurality of present $R_{10}$ to $R_{13}$ may each be the same or different; p and q may be the same or different and are an integer equal to or more than 0), and a polyether-modified (meth)acrylic compound represented by General formula (3) below

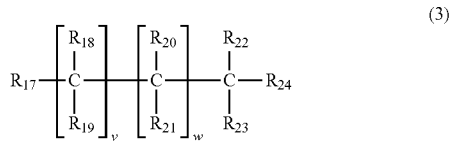

(wherein $R_{17}$ to $R_{24}$ may be the same or different, and at least one of $R_{17}$ to $R_{24}$ is a polyether group, and at least one is a (meth)acryloyl group or a linear or branched alkyl group having 1 to 20 carbon atoms and having a (meth)acryloyl group, and the other $R_{17}$ to $R_{24}$ each represent a linear or branched alkyl group having 1 to 20 carbon atoms, and a plurality of present $R_{18}$ to $R_{21}$ may each be the same or different; v and w may be the same or different and each represents an integer equal to or more than 0).

A3. The polymerizable composition for an optical material according to the above item A1 or A2, in which the polyether-modified compound is the polyether-modified siloxane compound represented by General Formula (1).

A4. The polymerizable composition for an optical material according to any one of the above items A1 to A3, in which the polyether-modified compound is included in an amount of equal to or more than 0.01% by weight in 100% by weight of the polymerizable composition for an optical material.

A5. The polymerizable composition for an optical material according to any one of the above items A1 to A4, in which the polymerization reactive compound is one type or two or more types of compounds selected from a polyiso(thio)cyanate compound, a poly(thio)epoxy compound, a polyoxetanyl compound, a polythietanyl compound, a poly(meth)acryloyl compound, a polyalkene compound, an alkyne compound, a poly(thi)ol compound, a polyamine compound, an acid anhydride, or a polycarboxylic acid compound.

A6. A molded article obtainable by heating and curing the polymerizable composition for an optical material according to any one of the above items A1 to A5.

A7. An optical material constituted of the molded article according to the above item A6.

A8. A plastic lens formed of the optical material according to the above item A7.

A9. A method for manufacturing an optical material, the method including cast polymerizing the polymerizable composition for an optical material according to any one of the above items A1 to A5.

A10. A plastic lens manufactured by the manufacturing method according to the above item A9.

B1. A polymerizable composition for an optical material, including a polyether-modified compound having a polyether group represented by General Formula (4) below and a polymerization reactive compound.

(In General Formula (4), $R_{25}$ represents a linear or branched alkylene group having 1 to 20 carbon atoms, $R_{26}$ represents a hydrogen atom, a linear or branched alkyl group having 1 to 20 carbon atoms, a linear or branched alkenyl group having 2 to 20 carbon atoms, or a linear or branched alkynyl group having 2 to 20 carbon atoms, a plurality of present $R_{23}$'s may be the same or different, and k is an integer equal to or more than 1.)

B2. The polymerizable composition for an optical material according to the above item B1, in which the polyether-modified compound is one or more compounds selected from a polyether-modified siloxane compound represented by General Formula (1) below

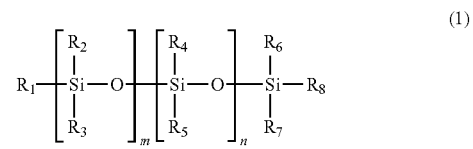

(wherein $R_1$ to $R_8$ may be the same or different and at least one of $R_1$ to $R_8$ is the polyether group represented by General Formula (4), and the other $R_1$ to $R_8$ may be the same or different and are a linear or branched alkyl group having 1 to 20 carbon atoms, a linear or branched alkoxy group having 1 to 20 carbon atoms, a hydroxyl group, or a polysiloxy group, a plurality of present $R_2$ to $R_5$ may each be the same or different, m and n are the same or different and are an integer equal to or more than 0), a polyether-modified fluoro compound represented by General Formula (2) below

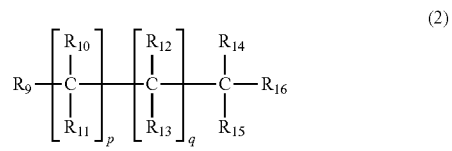

(wherein $R_9$ to $R_{16}$ may be the same or different and at least one of $R_9$ to $R_{16}$ is the polyether group represented by General Formula (4) and at least one is a fluorine atom or a linear or branched perfluoroalkyl group having 1 to 20 carbon atoms, and the other $R_9$ to $R_{16}$ represent a linear or branched alkyl group having 1 to 20 carbon atoms, a plurality of present $R_{10}$ to $R_{13}$ may each be the same or different, p and q may be the same or different and are an integer equal to or more than 0), and a polyether-modified (meth)acrylic compound represented by General formula (3) below

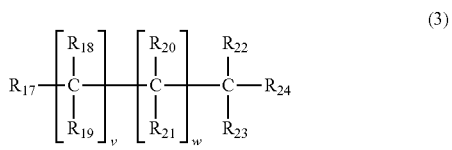

($R_{17}$ to $R_{24}$ may be the same or different, and at least one of $R_{17}$ to $R_{24}$ is the polyether group represented by General Formula (4) above, and at least one is a (meth)acryloyl group or a linear or branched alkyl group having 1 to 20 carbon atoms and having a (meth)acryloyl group, and the other $R_{17}$ to $R_{24}$ represent a linear or branched alkyl group having 1 to 20 carbon atoms, and a plurality of present $R_{18}$ to $R_{21}$ may each be the same or different, v and w may be the same or different and are an integer equal to or more than 0).

B3. The polymerizable composition for an optical material according to the above item B2, in which the polyether-modified compound is the polyether-modified siloxane compound represented by General Formula (1).

B4. The polymerizable composition for an optical material according to any one of the above items B1 to B3, in which $R_{26}$ of the polyether group represented by General Formula (4) is a hydrogen atom or a linear or branched alkyl group having 1 to 20 carbon atoms.

B5. The polymerizable composition for an optical material according to any one of the above items B1 to B3, in which $R_{26}$ of the polyether group represented by General Formula (4) is a linear or branched alkenyl group having 2 to 20 carbon atoms or a linear or branched alkynyl group having 2 to 20 carbon atoms.

B6. The polymerizable composition for an optical material according to any one of the above items B1 to B5, in which the polyether-modified compound is included in an amount of equal to or more than 0.01% by weight in 100% by weight of the polymerizable composition for an optical material.

B7. The polymerizable composition for an optical material according to any one of the above items B1 to B6, in which the polymerization reactive compound is one type or two or more types of compounds selected from a polyiso(thio)cyanate compound, a poly(thio)epoxy compound, a polyoxetanyl compound, a polythietanyl compound, a poly(meth)acryloyl compound, a polyalkene compound, an alkyne compound, a poly(thi)ol compound, a polyamine compound, an acid anhydride, or a polycarboxylic acid compound.

B8. A molded article obtainable by curing the polymerizable composition for an optical material according to any one of the above items B1 to B7.

B9. An optical material constituted of the molded article according to the above item B8.

B10. A plastic lens formed of the optical material according to the above item B9.

B11. A method for manufacturing an optical material, the method including cast polymerizing the polymerizable composition for an optical material according to any one of the above items B1 to B7.

B12. A plastic lens manufactured by the manufacturing method according to the above item B11.

EXAMPLES

Specific description will be given below of the present invention based on examples, but the present invention is not limited to these examples. The molded article and the plastic lens formed of the cured resin were evaluated by the following method.

Striae: Lenses were manufactured using polymerizable compositions immediately after preparing the polymerizable composition, after 2 hours from the preparation, after 4 hours from the preparation, after 6 hours from the preparation, after 8 hours from the preparation, and after 10 hours from the preparation, each lens was used for projection with an ultrahigh pressure mercury lamp (light source model OPM-252 HEG: manufactured by Ushio Inc.), and the transmitted image was visually evaluated for the presence or absence of striae. In the present example, these lenses are sequentially referred to as a lens immediately after preparation, a lens after 2 hours, a lens after 4 hours, a lens after 6 hours, a lens after 8 hours, and a lens after 10 hours.

Refractive index and Abbe number: Measurement was carried out at 20° C. using a refractometer KPR-20 (manufactured by Kalnew Optical Industries, Ltd.).

Heat Resistance (Glass Transition Temperature: Tg): Measured with a thermomechanical analyzer TMA-60 manufactured by Shimadzu Corporation using the TMA penetration method (with a 50 g load, a pin tip of 0.5 mmφ and a heating rate of 10° C./min).

Appearance: The turbidity of the created lens was visually confirmed in a dark room, x denotes that turbidity was confirmed and ○ denotes that turbidity was not confirmed.

Example 1

50.6 parts by weight of a mixture of 2,5-bis (isocyanatomethyl) bicyclo-[2.2.1]-heptane and 2,6-bis (isocyanatomethyl) bicyclo-[2.2.1]-heptane, 0.05 parts by weight of 2-(2-hydroxy-5-t-octylphenyl)-2H benzotriazole (Viosorb 583), 0.125 parts by weight of ZelecUN, 0.1 parts by weight of a polyether-modified siloxane compound (KL-100 manufactured by Kyoeisha Chemical Co., Ltd.) were added to a 2000 ml three-necked flask, and completely dissolved in a nitrogen atmosphere at 20° C. Thereafter, 23.9 parts by weight of pentaerythritol tetrakis mercaptopropionate, and a mixture liquid of 0.3 parts by weight of dibutyltin dichloride and 25.5 parts by weight of 4-mercaptomethyl-1,8 dimercapto-3,6-dithiaoctane were added and transferred to a bath with a temperature of 10° C., stirred and mixed for 20 minutes, and degassed further for 30 minutes under a reduced pressure of 0.20 kPa to obtain a resin composition.

In a molded mold having a cavity for creating lenses having a center thickness of 10 mm and formed of a 6-curve glass mold (upper mold) having a diameter of 78 mm and a 4-curve glass mold (lower mold) having a diameter of 78 mm, the obtained resin composition was injected into the cavity at a rate of 10 g/sec. The remaining resin composition was stored in a bath with a temperature of 10° C. so as not to generate heat.

The mold into which the resin composition was injected was added into a polymerization oven and gradually heated to 20° C. to 130° C. over 36 hours for polymerization. After completion of the polymerization, the mold was removed from the oven and the molded article was released from the inside of the cavity to obtain a lens. The above procedure was repeated every 2 hours for 10 hours after preparation of the resin composition.

Observation of the presence or absence of striae of each obtained lens confirmed that there were no striae in any of the lenses. In addition, the lens just after preparation exhibited good properties where the appearance was ○, the refractive index (ne) was 1.598, the Abbe number (υe) was 39, and the Tg was 115° C. The evaluation results are shown in Table 1.

Example 2

58.9 parts by weight of bis (4-isocyanatocyclohexyl) methane, 0.64 parts by weight of 2-(3't-butyl-2'-hydroxy-5'-methylphenyl)-5-chlorobenzotriazole (Tinuvin 326), 1.5 parts by weight of Evasorb 109, 0.1 parts by weight of ZelecUN, 0.1 parts by weight of a polyether-modified siloxane compound (KL-100 manufactured by Kyoeisha Chemical Co., Ltd.) were added to a 2000 ml three-necked flask, and completely dissolved in a nitrogen atmosphere at 20° C. Thereafter, a mixture liquid of 0.15 parts by weight of dibutyltin dichloride and 41.1 parts by weight of a polythiol compound which is a mixture of 5,7-, 4,7-, 4,8-dimercaptomethyl-1,11-mercapto-3,6,9-trithiaundecane were added and transferred to a bath with a temperature of 10° C., stirred and mixed for 20 minutes, and degassed further for 30 minutes under a reduced pressure of 0.20 kPa to obtain a resin composition.

In a molded mold having a cavity for creating lenses having a center thickness of 10 mm and formed of a 6-curve glass mold (upper mold) having a diameter of 78 mm and a 4-curve glass mold (lower mold) having a diameter of 78 mm, the obtained resin composition was injected into the cavity at a rate of 10 g/sec. The remaining resin composition was stored in a bath at 10° C. so as not to generate heat.

The mold into which the resin composition was injected was added into a polymerization oven and gradually heated to 20° C. to 130° C. over 36 hours for polymerization. After completion of the polymerization, the mold was removed from the oven and the molded article was released from the inside of the cavity to obtain a lens. The above procedure was repeated every 2 hours for 10 hours after preparation of the resin composition.

Observation of the presence or absence of striae of each obtained lens confirmed that there were no striae with the lenses up to 8 hours after preparation. In addition, the lens just after preparation exhibited good properties where the appearance was ○, the refractive index (ne) was 1.602, the Abbe number (νe) was 39, and the Tg was 121° C. The evaluation results are shown in Table 1.

Example 3

3.0 parts by weight of an ultraviolet absorber (Viosorb 583 manufactured by Kyodo Chemical Co., Ltd.), 0.6 parts by weight of ZelecUN (acid phosphate ester manufactured by STEPAN Co., Ltd.), and 0.4 parts by weight of Tinuvin 292 (hindered amine compound manufactured by BASF Co., Ltd.) were mixed and dissolved in 41.2 parts by weight of a mixture of 2,4-tolylene diisocyanate and 2,6-tolylene diisocyanate to obtain a uniform solution. After maintaining at 20° C., 8.82 parts by weight of a propylene oxide adduct of trimethylolpropane (Desmophen 4011T manufactured by Bayer) were added and reacted at 20° C. for 3 hours to create a prepolymer. 0.1 parts by weight of a polyether-modified siloxane compound (KL-100: manufactured by Kyoeisha Chemical Co., Ltd.) was added to the obtained prepolymer, maintained at 20° C., and then 49.98 parts by weight of a propylene oxide adduct of trimethylolpropane (Desmophen 4011T manufactured by Bayer) was uniformly mixed with a stirrer bar at 20° C. to obtain a resin composition.

In a molded mold having a cavity for creating lenses having a center thickness of 10 mm and formed of a 6-curve glass mold (upper mold) having a diameter of 78 mm and a 4-curve glass mold (lower mold) having a diameter of 78 mm, the obtained resin composition was injected into the cavity at a rate of 10 g/sec.

The mold into which the resin composition was injected was put into a polymerization oven and polymerization was carried out by gradually heating from 20° C. to 130° C. over 12 hours. After completion of the polymerization, the mold was removed from the oven and the molded article was released from the inside of the cavity to obtain a lens.

Observation of the presence or absence of striae of the obtained lens confirmed that there were no striae. In addition, the lens just after preparation exhibited good properties where the appearance was ○, the refractive index (ne) was 1.549, the Abbe number (νe) was 34, and the Tg was 100° C. The evaluation results are shown in Table 1.

Example 4

A lens was obtained in the same manner as in Example 1 except that the blending amount of the polyether-modified siloxane compound (KL-100: manufactured by Kyoeisha Chemical Co., Ltd.) was changed to 0.5 parts by weight. Observation of the presence or absence of striae of each obtained lens confirmed that there were no striae in any of the lenses from immediately after preparation to 10 hours after. In addition, the lens just after preparation exhibited good properties where the appearance was ○, the refractive index (ne) was 1.598, the Abbe number (νe) was 39, and the Tg was 114° C. The evaluation results are shown in Table 1.

Example 5

A lens was obtained in the same manner as in Example 2 except that the blending amount of the polyether-modified siloxane compound (KL-100: manufactured by Kyoeisha Chemical Co., Ltd.) was changed to 0.5 parts by weight. Observation of the presence or absence of striae of each obtained lens confirmed that there were no striae in any of the lenses until 10 hours after preparation. In addition, the lens just after preparation exhibited good properties where the appearance was ○, the refractive index (ne) was 1.602, the Abbe number (νe) was 39, and the Tg was 119° C. The evaluation results are shown in Table 1.

Example 6

A lens immediately after preparation was obtained in the same manner as in Example 3 except that the blending amount of the polyether-modified siloxane compound (KL-100: manufactured by Kyoeisha Chemical Co., Ltd.) was changed to 0.5 parts by weight. Observation of the presence or absence of striae of the obtained lens confirmed that there were no striae. In addition, the lens exhibited good properties where the appearance was ○, the refractive index (ne) was 1.548, the Abbe number (νe) was 34, and the Tg was 100° C. The evaluation results are shown in Table 1.

Example 7

A lens was obtained in the same manner as in Example 1 except that the blending amount of the polyether-modified siloxane compound (KL-100: manufactured by Kyoeisha Chemical Co., Ltd.) was changed to 1.5 parts by weight. Observation of the presence or absence of striae of each obtained lens confirmed that there were no striae in any of the lenses until 10 hours after preparation. In addition, the lens just after preparation exhibited good properties where the appearance was ○, the refractive index (ne) was 1.602, the Abbe number (νe) was 39, and the Tg was 113° C. The evaluation results are shown in Table 1.

Example 8

A lens was obtained in the same manner as in Example 2 except that the blending amount of the polyether-modified siloxane compound (KL-100: manufactured by Kyoeisha Chemical Co., Ltd.) was changed to 1.5 parts by weight. Observation of the presence or absence of striae of each obtained lens confirmed that there were no striae in any of the lenses until 10 hours after preparation. In addition, the lens just after preparation exhibited good properties where the appearance was ○, the refractive index (ne) was 1.602, the Abbe number (υe) was 39, and the Tg was 119° C. The evaluation results are shown in Table 1.

Example 9

A lens immediately after preparation was obtained in the same manner as in Example 3 except that the blending amount of the polyether-modified siloxane compound (KL-100: manufactured by Kyoeisha Chemical Co., Ltd.) was changed to 1.5 parts by weight. Observation of the presence or absence of striae of the obtained lens confirmed that there were no striae. In addition, the lens exhibited good properties where the appearance was ○, the refractive index (ne) was 1.548, the Abbe number (υe) was 34, and a slightly decreased Tg was 98° C. The evaluation results are shown in Table 1.

Comparative Example 1

A lens was obtained in the same manner as in Example 1 except that the polyether-modified siloxane compound (KL-100: manufactured by Kyoeisha Chemical Co., Ltd.) was not blended. The presence or absence of striae of each obtained lens was observed, and striae were confirmed in the lens after 4 hours. In addition, for the lens just after preparation, the appearance was ○, the refractive index (ne) was 1.598, the Abbe number (υe) was 39, and the Tg was 114° C. The evaluation results are shown in Table 1.

Comparative Example 2

A lens was obtained in the same manner as in Example 2 except that the polyether-modified siloxane compound (KL-100: manufactured by Kyoeisha Chemical Co., Ltd.) was not blended. As a result of observing the striae, striae were confirmed in the lens immediately after preparation. In addition, for the lens just after preparation, the appearance was ○, the refractive index (ne) was 1.602, the Abbe number (υe) was 39, and the Tg was 119° C. The evaluation results are shown in Table 1.

Comparative Example 3

A lens was obtained in the same manner as in Example 3 except that the polyether-modified siloxane compound (KL-100: manufactured by Kyoeisha Chemical Co., Ltd.) was not blended. As a result of observing the striae, striae were confirmed in the lens immediately after preparation. In addition, for the lens just after preparation, the appearance was ○, the refractive index (ne) was 1.548, the Abbe number (υe) was 34, and the Tg was 100° C. The evaluation results are shown in Table 1.

TABLE 1

| | (Parts by weight) | | | | | | |
|---|---|---|---|---|---|---|---|
| | Example 1 | Example 2 | Example 3 | Example 4 | Example 5 | Example 6 | Example 7 |
| Isocyanate compound | | | | | | | |
| a-1 | 50.6 | | | 50.6 | | | 50.6 |
| a-2 | | 58.9 | | | 58.9 | | |
| TDI Prepolymer | | | | | | | |
| b-1 | | | 50.02 | | | 50.02 | |
| Thiol compound | | | | | | | |
| c-1 | 23.9 | | | 23.9 | | | 23.9 |
| c-2 | 25.5 | | | 25.5 | | | 25.5 |
| c-3 | | 41.1 | | | 41.1 | | |
| Polyol compound | | | | | | | |
| d-1 | | | 49.98 | | | 49.98 | |
| Polyether-modified compound (KL-100) | 0.1 (1000) | 0.1 (1000) | 0.1 (1000) | 0.5 (5000) | 0.5 (5000) | 0.5 (5000) | 1.5 (15000) |
| Time in which striae were generated | Not generated after 10 hours | Not generated after 8 hours | Not generated (lens evaluation immediately after preparation only) | Not generated after 10 hours | Not generated after 10 hours | Not generated (lens evaluation immediately after preparation only) | Not generated after 10 hours |
| Appearance | ○ | ○ | ○ | ○ | ○ | ○ | ○ |
| Refractive index (ne) | 1.598 | 1.602 | 1.549 | 1.598 | 1.602 | 1.548 | 1.602 |
| Abbe number (νe) | 39 | 39 | 34 | 39 | 39 | 34 | 39 |
| Heat resistance: Tg | 115 | 121 | 100 | 114 | 119 | 100 | 113 |

TABLE 1-continued

| | Example 8 | Example 9 | Comparative Example 1 | Comparative Example 2 | Comparative Example 3 |
|---|---|---|---|---|---|
| (Parts by weight) | | | | | |
| Isocyanate compound | | | | | |
| a-1 | | | 50.6 | | |
| a-2 | 58.9 | | | 58.9 | |
| TDI Prepolymer | | | | | |
| b-1 | | 50.02 | | | 50.02 |
| Thiol compound | | | | | |
| c-1 | | | 23.9 | | |
| c-2 | | | 25.5 | | |
| c-3 | 41.1 | | | 41.1 | |
| Polyol compound | | | | | |
| d-1 | | 49.98 | | | 49.98 |
| Polyether-modified compound (KL-100) | 1.5 (15000) | 1.5 (15000) | — | — | — |
| Time in which striae were generated | Not generated after 10 hours | Not generated (lens evaluation immediately after preparation only) | Generated after 4 hours | Striae generation from lens immediately after preparation | Striae generation from lens immediately after preparation |
| Appearance | ○ | ○ | ○ | ○ | ○ |
| Refractive index (ne) | 1.602 | 1.548 | 1.598 | 1.602 | 1.548 |
| Abbe number (ve) | 39 | 34 | 39 | 39 | 34 |
| Heat resistance: Tg | 119 | 98 | 114 | 119 | 100 |

In parentheses is the amount (ppm) of the polyether-modified compound with respect to the total amount of the isocyanate compound and the thiol compound.

The compounds listed in Table 1 are as follows.

a-1: a mixture of 2,5-bis (isocyanatomethyl) bicyclo-[2.2.1]-heptane and 2,6-bis (isocyanatomethyl) bicyclo-[2.2.1]-heptane a-2: bis (4-isocyanatocyclohexyl) methane b-1: prepolymer formed of a mixture of 2,4-tolylene diisocyanate and 2,6-tolylene diisocyanate and a propylene oxide adduct of trimethylolpropane c-1: pentaerythritol tetrakis mercaptopropionate c-2: 4-mercaptomethyl-1,8-dimercapto-3,6-dithiaoctane c-3: a mixture of 5,7 (or 4,7 or 4,8)-dimercaptomethyl-1,11-mercapto-3,6,9-trithiaundecane d-1: a propylene oxide adduct of trimethylolpropane (Desmophen 4011 T manufactured by Bayer)

Example 10

58.9 parts by weight of bis (4-isocyanatocyclohexyl) methane, 0.64 parts by weight of 2-(3't-butyl-2'-hydroxy-5'-methylphenyl)-5-chlorobenzotriazole (Tinuvin 326), 1.5 parts by weight of Evasorb 109, 0.1 parts by weight of ZelecUN, 0.4 parts by weight of a polyether-modified siloxane compound containing 68% by weight of the compound represented by the following formula (6) and 29% by weight of the compound represented by the formula (7) were added to a 2000 ml three-necked flask, and completely dissolved in a nitrogen atmosphere at 20° C. Thereafter, a mixture liquid of 0.15 parts by weight of dibutyltin dichloride and 41.1 parts by weight of a polythiol compound which is a mixture of 5,7-, 4,7-, 4,8-dimercaptomethyl-1,11-mercapto-3,6,9-trithiaundecane were further added and transferred to a bath with a temperature of 10° C., stirred and mixed for 20 minutes, and degassed further for 30 minutes under a reduced pressure of 0.20 kPa to obtain a resin composition.

In a molded mold having a cavity for creating lenses having a center thickness of 10 mm and formed of a 6-curve glass mold (upper mold) having a diameter of 78 mm and a 4-curve glass mold (lower mold) having a diameter of 78 mm, the obtained resin composition was injected into the cavity at a rate of 10 g/sec. The remaining resin composition was stored in a bath at 10° C. so as not to generate heat.

The mold into which the resin composition was injected was added into a polymerization oven and gradually heated to 20° C. to 130° C. over 36 hours for polymerization. After completion of the polymerization, the mold was removed from the oven and the molded article was released from the inside of the cavity to obtain a lens. The above procedure was repeated every 2 hours for 10 hours after preparation of the resin composition.

Observation of the presence or absence of striae of each obtained lens confirmed that there were no striae up to the lens after 10 hours. In addition, the lens just after preparation exhibited good properties where the appearance was ○, the refractive index (ne) was 1.602, the Abbe number (ve) was 39, and the Tg was 120° C.

Here, the molecular weight of the compound represented by the formula (6) is approximately 2000 and the molecular weight of the compound represented by the formula (7) is approximately 1000.

In addition, in the formula (6), a+c=5 to 50, b=5 to 50, d=50 to 500, and e=5 to 50, and in the formula (7), f+h=1 to 20, and g=1 to 10.

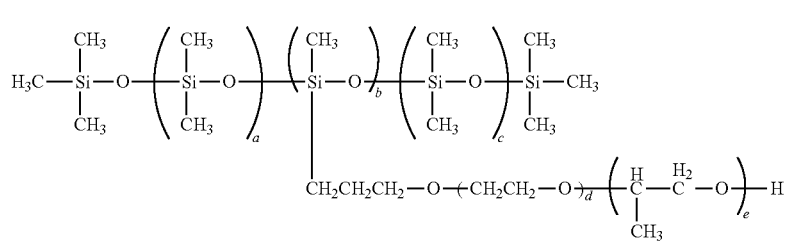
(6)

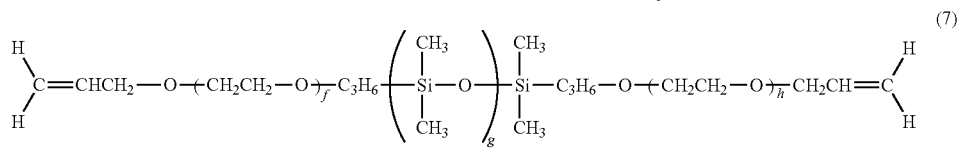
(7)

This application claims priority based on Japanese Patent Application No. 2015-019085 filed on Feb. 3, 2015, Japanese Patent Application No. 2015-037752 filed on Feb. 27, 2015, and Japanese Patent Application No. 2015-226081 filed on Nov. 18, 2015, the disclosures of which are incorporated herein by reference in their entirety.

The invention claimed is:

1. A polymerizable composition for an optical material comprising:
   a polyether-modified compound having a polyether group represented by General Formula (4) below; and
   a polymerization reactive compound of a polyiso(thio)cyanate compound,

(4)

(in General Formula (4), $R_{25}$ represents a linear or branched alkylene group having 1 to 20 carbon atoms, $R_{26}$ represents a hydrogen atom, a plurality of present $R_{25}$'s may be the same or different, and k is an integer equal to or more than 1), wherein the polymerizable composition does not comprise a blowing agent,
wherein the polyether-modified compound is one or more compounds selected from a polyether-modified siloxane compound represented by General Formula (1) below

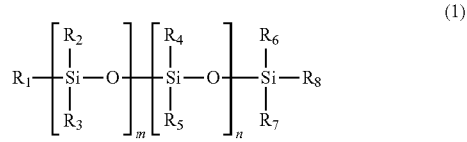
(1)

(wherein $R_1$ to $R_8$ may be the same or different and at least one of $R_1$ to $R_8$ is the polyether group represented by General Formula (4), and the other $R_1$ to $R_8$ may be the same or different and are a linear or branched alkyl group having 1 to 20 carbon atoms, a linear or branched alkoxy group having 1 to 20 carbon atoms, a hydroxyl group, or a polysiloxy group, a plurality of present $R_2$ to $R_5$ may each be the same or different, m and n are the same or different and are an integer equal to or more than 0).

2. The polymerizable composition for an optical material according to claim 1,
   wherein the polyether-modified compound is included in an amount of equal to or more than 0.01% by weight in 100% by weight of the polymerizable composition for an optical material.

3. A molded article obtainable by curing the polymerizable composition for an optical material according to claim 1.

4. An optical material constituted of the molded article according to claim 3.

5. A plastic lens formed of the optical material according to claim 4.

6. A method for manufacturing an optical material, the method comprising a step of cast polymerizing the polymerizable composition for an optical material according to claim 1.

7. A plastic lens manufactured by the manufacturing method according to claim 6.

* * * * *